United States Patent
Yasuda et al.

(10) Patent No.: US 12,395,735 B2
(45) Date of Patent: Aug. 19, 2025

(54) IMAGE STABILIZATION CONTROL APPARATUS AND METHOD

(71) Applicant: CANON KABUSHIKI KAISHA, Tokyo (JP)

(72) Inventors: Ryuichiro Yasuda, Tokyo (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 381 days.

(21) Appl. No.: 17/865,515

(22) Filed: Jul. 15, 2022

(65) Prior Publication Data

US 2023/0027443 A1 Jan. 26, 2023

(30) Foreign Application Priority Data

Jul. 26, 2021 (JP) ................................. 2021-121939

(51) Int. Cl.
*H04N 23/68* (2023.01)
(52) U.S. Cl.
CPC ....... *H04N 23/683* (2023.01); *H04N 23/6812* (2023.01); *H04N 23/687* (2023.01)
(58) Field of Classification Search
CPC ............. H04N 23/683; H04N 23/6812; H04N 23/687; H04N 23/6815
See application file for complete search history.

(56) References Cited

U.S. PATENT DOCUMENTS

2014/0327789 A1* 11/2014 Tsuchiya ............ H04N 23/6812 348/208.11
2016/0065853 A1 3/2016 Kang et al.

FOREIGN PATENT DOCUMENTS

| JP | 2007212556 A | 8/2007 |
|---|---|---|
| JP | 2010025965 A | 2/2010 |
| JP | 2013148717 A | 8/2013 |
| JP | 2014-021464 A | 2/2014 |
| JP | 2014068336 A | 4/2014 |
| JP | 5675179 B2 | 2/2015 |
| JP | 2016181000 A | 10/2016 |
| JP | 2018146992 | 9/2018 |
| KR | 20160026036 A | 3/2016 |

OTHER PUBLICATIONS

The above foreign patent documents in Apr. 14, 2025 Japanese Office Action, which is enclosed without an English Translation, that issued in Japanese Patent Application No. 2021-121939.

* cited by examiner

*Primary Examiner* — Tat C Chio
(74) *Attorney, Agent, or Firm* — Cowan, Liebowitz & Latman, P.C.

(57) ABSTRACT

An image stabilization control apparatus comprising: a first receiving unit that receives a translational shake signal that indicates a translational shake in a first direction; a second receiving unit that receives a first rotational shake signal that indicates a rotational shake about a first axis that intersects with the direction of gravity and the first direction; a first calculation unit that finds a first fluctuation range of a gravitational component in the first direction based on the first rotational shake signal; a second calculation unit that finds an amount of shake in the first direction based on the translational shake signal and the first fluctuation range; and a third calculation unit that finds a target value for reducing a shake in the first direction based on the amount of shake found by the second calculation unit.

6 Claims, 21 Drawing Sheets

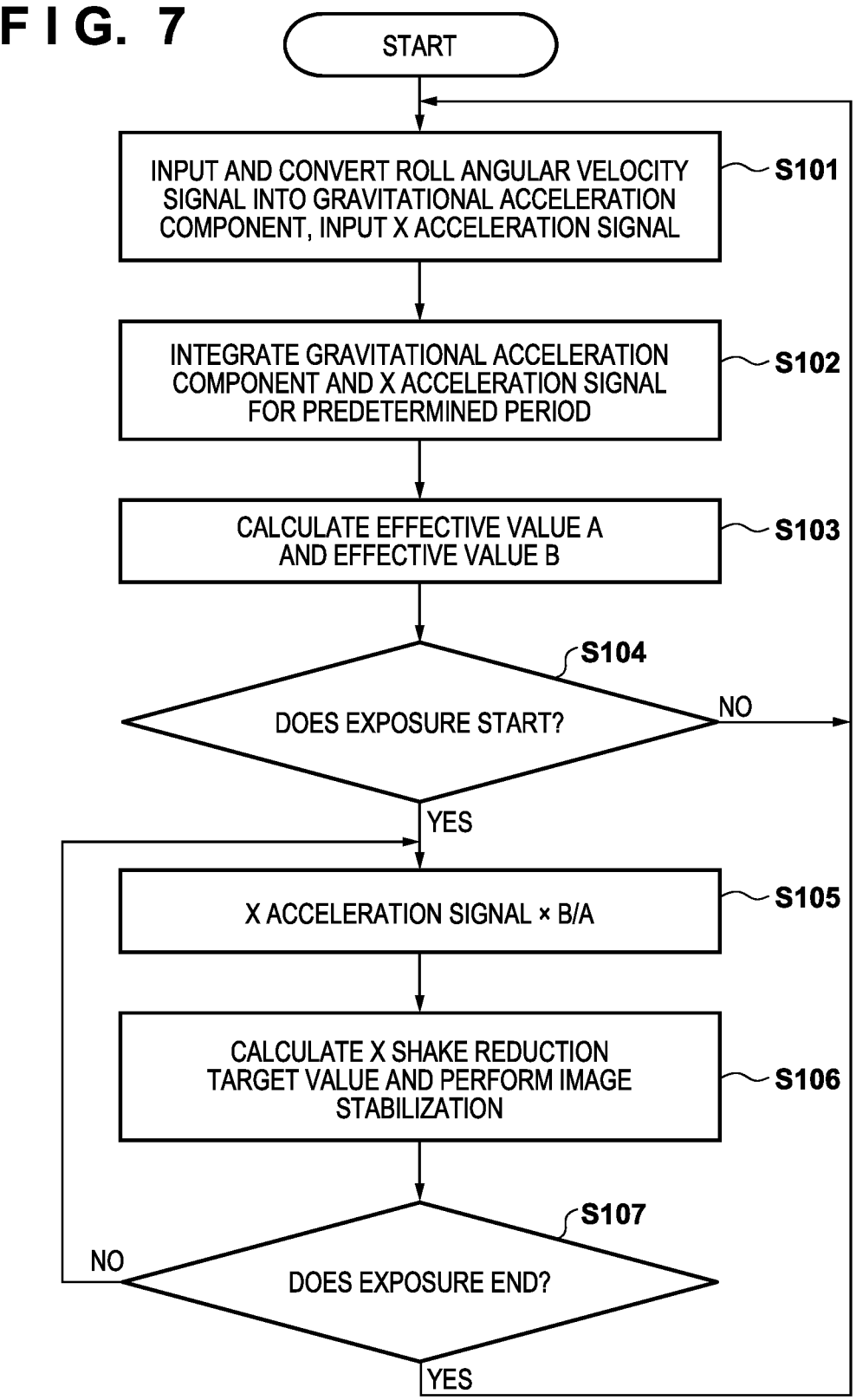

FIG. 16

Block diagram showing CAMERA CPU (12) with the following components and signal flow:

Inputs:
- FIRST ANGULAR VELOCITY METER (15rg)
- SECOND ACCELEROMETER (16xa)
- SECOND ANGULAR VELOCITY METER (15yg)

Within CAMERA CPU (12):
- GRAVITATIONAL ACCELERATION FLUCTUATION CALCULATION UNIT (12a)
- FIRST BAND-PASS FILTER (12q)
- FIRST FLUCTUATION RANGE CALCULATION UNIT (12b) → EFFECTIVE VALUE B
- SECOND BAND-PASS FILTER (12r)
- SECOND FLUCTUATION RANGE CALCULATION UNIT (12d) → EFFECTIVE VALUE A
- PHASE DETERMINATION UNIT (12i)
- THIRD BAND-PASS FILTER (12s)
- THIRD FLUCTUATION RANGE CALCULATION UNIT (12f) → EFFECTIVE VALUE D OF ANGULAR VELOCITY
- EFFECTIVE VALUE CORRECTION UNIT (12j) → EFFECTIVE VALUE C = |A−B| or C = A+B
- RADIUS-OF-GYRATION CALCULATION UNIT (12g)
- MULTIPLICATION UNIT (12h)
- TARGET VALUE CALCULATION UNIT (12e)

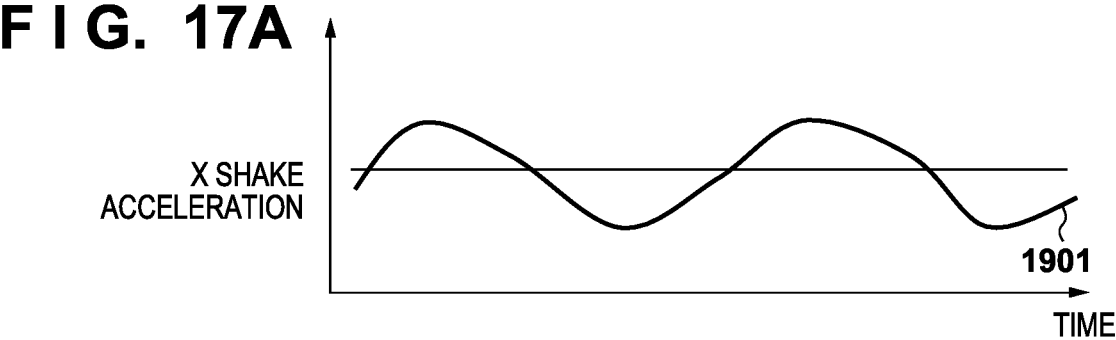
FIG. 17A — X SHAKE ACCELERATION — 1901
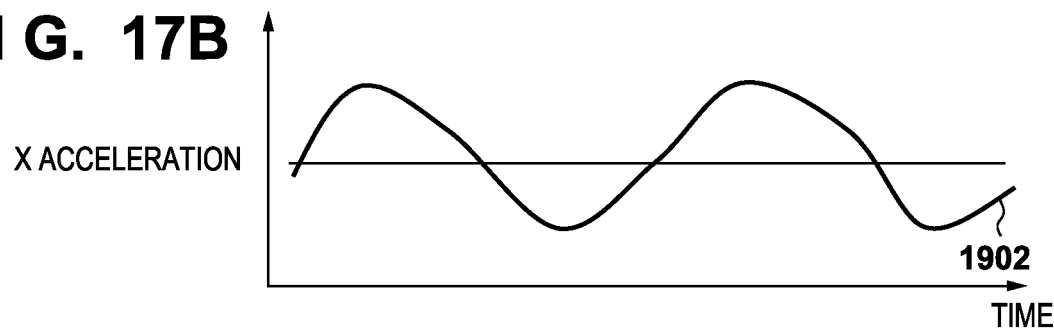
FIG. 17B — X ACCELERATION — 1902
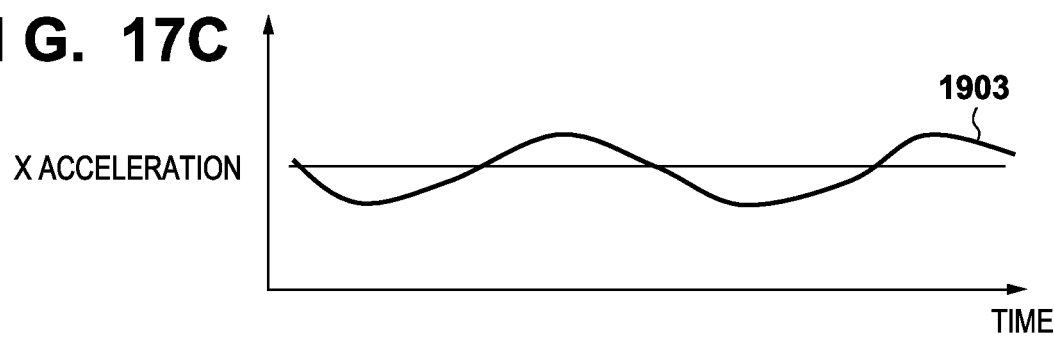
FIG. 17C — X ACCELERATION — 1903
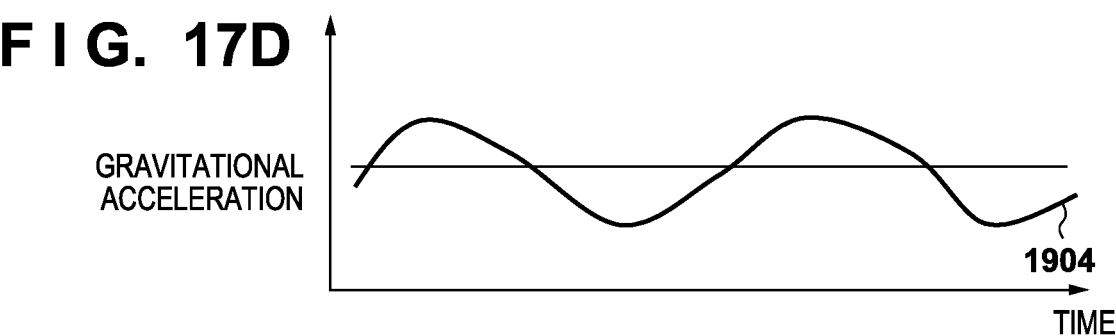
FIG. 17D — GRAVITATIONAL ACCELERATION — 1904

IMAGE STABILIZATION CONTROL APPARATUS AND METHOD

BACKGROUND OF THE INVENTION

Field of the Invention

The present invention relates to an image stabilization control apparatus and method, and more particularly to a technique for reducing the influence of gravitational acceleration on image stabilization.

Description of the Related Art

Conventionally, in an image capturing apparatus, a technique of detecting acceleration in the directions of three axes and angular velocity around the three axes and performing matrix calculation on these signals of the acceleration and the angular velocity to obtain an amount of fluctuation of the gravitational acceleration exerted on the acceleration in the X direction has been used for navigation purposes, for example (see Japanese Patent Laid-Open No. 2014-021464).

Furthermore, Japanese Patent No. 5675179 discloses a method of reducing deterioration on images caused by gravitational acceleration by using an accelerometer.

However, the technique disclosed in Japanese Patent No. 5675179 requires a highly accurate angular velocity meter and accelerometer, and also requires a sufficient stabilization time to obtain a calculation result. Therefore, the method of Japanese Patent No. 5675179 is not suitable for devices such as cameras, which are often carried around and frequently perform shooting.

SUMMARY OF THE INVENTION

The present invention has been made in consideration of the above situation, and while reducing the cost of an angular velocity meter and accelerometer, more stably reduces an effect of gravitational acceleration exerted on image stabilization.

According to the present invention, provided is an image stabilization control apparatus comprising one or more processors and/or circuitry which functions as: a first receiving unit that receives a translational shake signal that indicates a translational shake in a first direction; a second receiving unit that receives a first rotational shake signal that indicates a rotational shake about a first axis that intersects with the direction of gravity and the first direction; a first calculation unit that finds a first fluctuation range of a gravitational component in the first direction based on the first rotational shake signal; a second calculation unit that finds an amount of shake in the first direction based on the translational shake signal and the first fluctuation range; and a third calculation unit that finds a target value for reducing a shake in the first direction based on the amount of shake found by the second calculation unit.

Further, according to the present invention, provided is an image stabilization control apparatus comprising one or more processors and/or circuitry which functions as: a first receiving unit that receives a translational shake signal that indicates a translational shake in a first direction; a second receiving unit that receives a rotational shake signal that indicates a rotational shake about a first axis that intersects with the direction of gravity and the first direction; an amount-of-shake acquisition unit that finds an amount of shake in the first direction by adjusting a gain to be applied to the translational shake signal based on the rotational shake signal and correcting the translational shake signal with the gain; and a target value acquisition unit that finds a target value for reducing a shake in the first direction based on the amount of shake obtained by the amount-of-shake acquisition unit.

Furthermore, according to the present invention, provided is an image stabilization control method comprising: receiving a translational shake signal that indicates a translational shake in a first direction; receiving a rotational shake signal that indicates a rotational shake about an axis that intersects with the direction of gravity and the first direction; finding a fluctuation range of a gravitational component in the first direction based on the rotational shake signal; finding an amount of shake in the first direction based on the translational shake signal and the fluctuation range; and finding a target value for reducing a shake in the first direction based on the amount of shake in the first direction.

Furthermore, according to the present invention, provided is an image stabilization control method comprising: receiving a translational shake signal that indicates a translational shake in a first direction; receiving a rotational shake signal that indicates a rotational shake about an axis that intersects with the direction of gravity and the first direction; finding an amount of shake in the first direction by adjusting a gain to be applied to the translational shake signal based on the rotational shake signal and correcting the translational shake signal with the gain; and finding a target value for reducing a shake in the first direction based on the amount of shake in the first direction.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a flowchart showing a method of reducing X shake according to the first embodiment.

FIG. 16 is a block diagram showing a functional configuration for calculating an X shake reduction target value by reducing a gravitational acceleration component superimposed on an X acceleration signal according to a fifth embodiment.

FIGS. 17A to 17D are graphs for explaining a method of reducing a gravitational acceleration component from an X acceleration signal according to the fifth embodiment.

DESCRIPTION OF THE EMBODIMENTS

Figure 1:
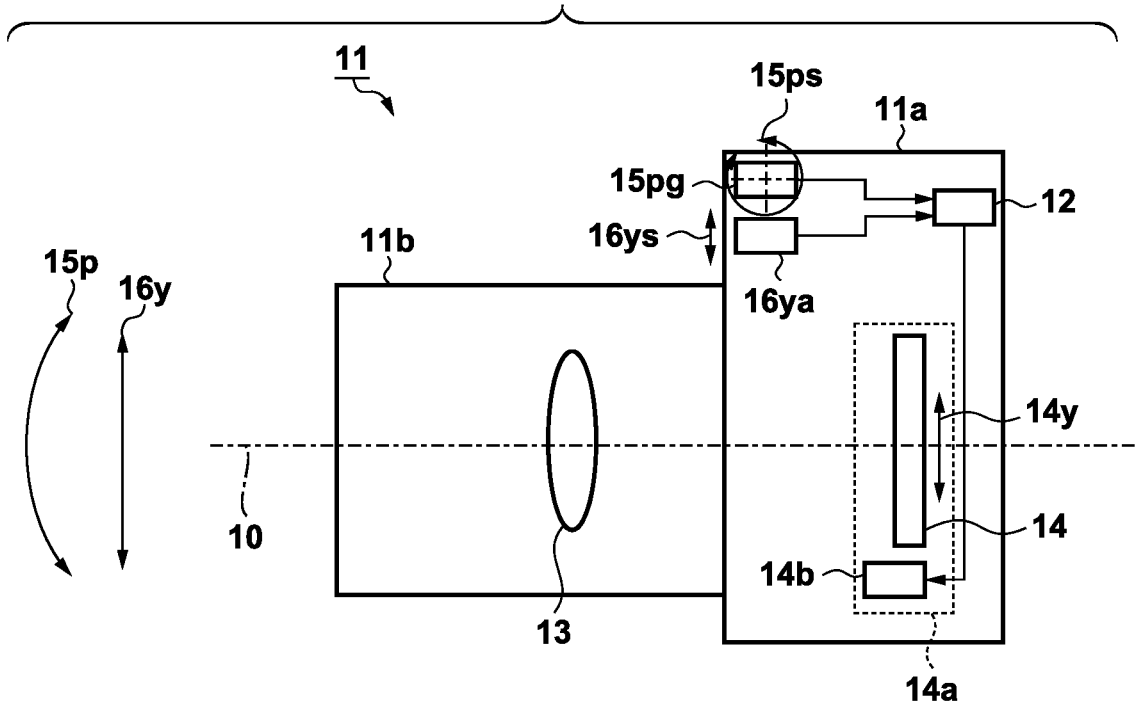
FIG. 1 is a side view of a camera according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will be described below.

Figure 2:
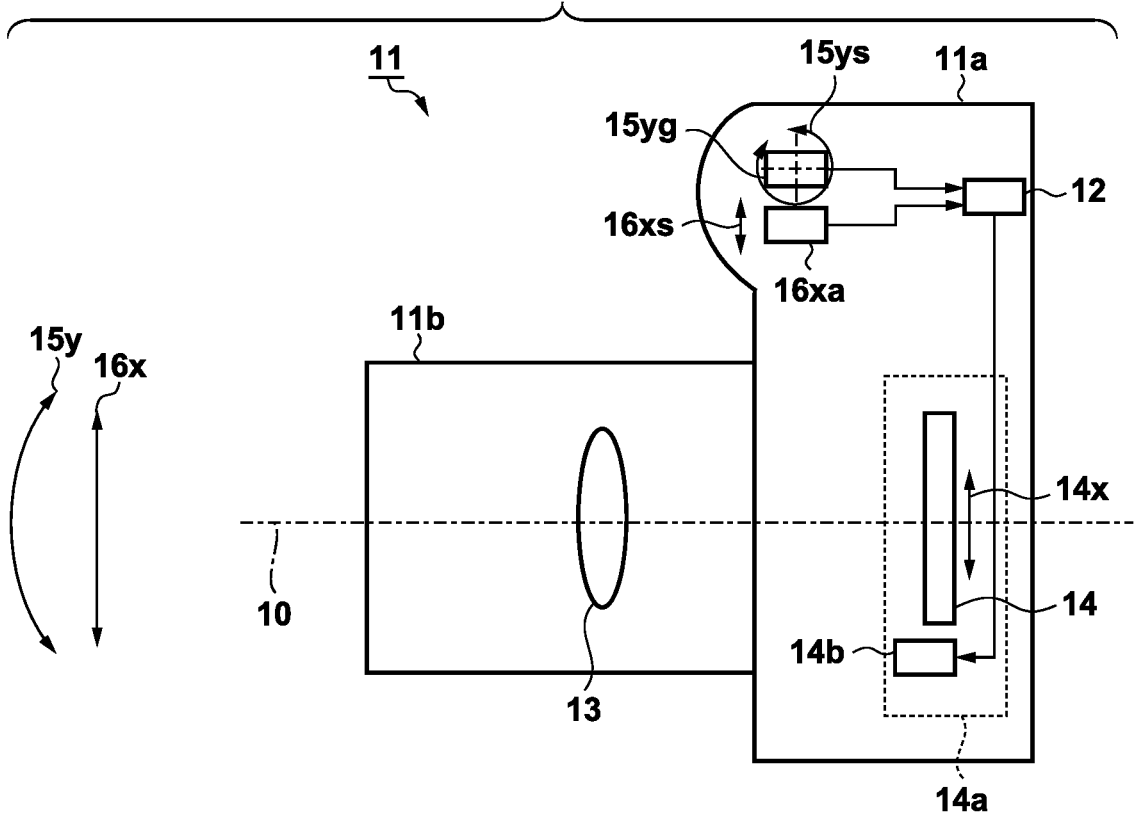
FIG. 2 is a top view of the camera according to the first embodiment.
Figure 3:
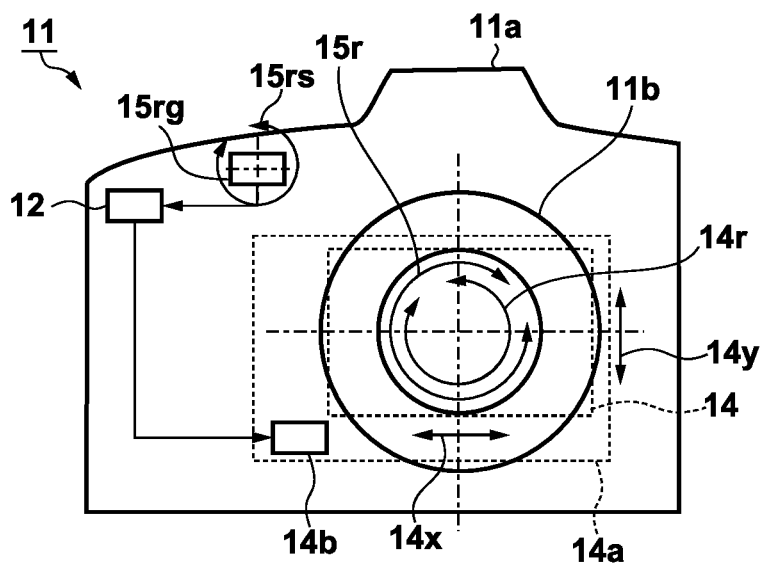
FIG. 3 is a front view of the camera according to the first embodiment.

FIG. 1 is a side view, FIG. 2 is a top view, and FIG. 3 is a front view of a camera 11 showing a simple functional configuration of an image stabilization control system in the camera 11 comprised of a camera body 11a and an interchangeable lens 11b that can be attached to and detached from the camera body 11a.

A camera CPU 12 provided in the camera body 11a controls a shooting operation and image stabilization control of the camera 11 in response to a shooting instruction operation or the like from a photographer.

When a light flux from a subject along an optical axis 10 enters an image sensor 14 through an imaging optical system 13 provided in the interchangeable lens 11b, the image sensor 14 photoelectrically converts the incident light flux and outputs an image signal.

In FIG. 1, a third angular velocity meter 15$pg$ detects an angular velocity of a rotational shake in the direction (pitch direction) indicated by an arrow 15$ps$ applied to the camera 11, and output an angular velocity signal (referred to as "pitch angular velocity signal", hereinafter). The pitch angular velocity signal is input to the camera CPU 12, and the camera CPU 12 performs a calculation using the pitch angular velocity signal, obtains a pitch shake reduction target value for reducing the angular shake (referred to as "pitch shake", hereinafter) indicated by an arrow 15$p$, and outputs the pitch shake reduction target value to an actuator 14$b$. The actuator 14$b$ moves the image sensor 14 in the direction indicated by an arrow 14$y$ based on the pitch shake reduction target value, thereby reducing the deviation of the image plane caused by the pitch shake. In the first embodiment, the image sensor 14 and a mechanism (not shown) that movably holds the image sensor 14 configure an image stabilization unit 14$a$.

A third accelerometer 16$ya$ detects the acceleration of a translational shake in the direction (Y direction) indicated by an arrow 16$ys$ applied to the camera 11, and outputs an acceleration signal (referred to as "Y acceleration signal", hereinafter). The Y acceleration signal is input to the camera CPU 12, and the camera CPU 12 performs a calculation using the Y acceleration signal, obtains a Y shake reduction target value for reducing a translational shake (referred to as "Y shake", hereinafter) indicated by an arrow 16$y$, and output the Y shake reduction target value to the actuator 14$b$. The actuator 14$b$ moves the image sensor 14 in the direction indicated by the arrow 14$y$ based on the Y shake reduction target value, thereby reducing the deviation of the image plane caused by the Y shake.

In FIG. 2, a second angular velocity meter 15$yg$ detects an angular velocity of a rotational shake in the direction (yaw direction) indicated by an arrow 15$ys$ applied to the camera 11, and output an angular velocity signal (referred to as "yaw angular velocity signal", hereinafter). The yaw angular velocity signal (rotational shake signal) is input to the camera CPU 12, and the camera CPU 12 performs a calculation using this yaw angular velocity signal, obtains a yaw shake reduction target value for reducing the angular shake (referred to as "yaw shake", hereinafter) indicated by an arrow 15y, and outputs the yaw shake reduction target value to the actuator 14b. The actuator 14b moves the image sensor 14 in the direction indicated by an arrow 14x based on the yaw shake reduction target value, thereby reducing the deviation of the image plane caused by the yaw shake.

A second accelerometer 16xa detects the acceleration of a translational shake in the direction (X direction) indicated by an arrow 16xs applied to the camera 11, and outputs an acceleration signal (referred to as "X acceleration signal", hereinafter). The X acceleration signal is input to the camera CPU 12, and the camera CPU 12 performs a calculation using the X acceleration signal, obtains an X shake reduction target value for reducing a translational shake (referred to as "X shake", hereinafter) indicated by an arrow 16x, and output the X shake reduction target value to the actuator 14b. The actuator 14b moves the image sensor 14 in the direction indicated by the arrow 14x based on the X shake reduction target value, thereby reducing the deviation of the image plane caused by the X shake.

In FIG. 3, a first angular velocity meter 15rg detects an angular velocity of a rotational shake in the direction (roll direction) indicated by an arrow 15rs applied to the camera 11, and output an angular velocity signal (referred to as "roll angular velocity signal", hereinafter). The roll angular velocity signal (rotational shake signal) is input to the camera CPU 12, and the camera CPU 12 performs a calculation using this roll angular velocity signal, obtains a roll shake reduction target value for reducing the angular shake (referred to as "roll shake", hereinafter) indicated by an arrow 15r, and outputs the roll shake reduction target value to the actuator 14b. The actuator 14b moves the image sensor 14 in the direction indicated by an arrow 14r based on the roll shake reduction target value, thereby reducing the deviation of the image plane caused by the roll shake.

Next, with reference to FIGS. 4A and 4B, the effect of the gravitational acceleration exerted on the second accelerometer 16xa due to the roll shake will be described.

Figure 4A:
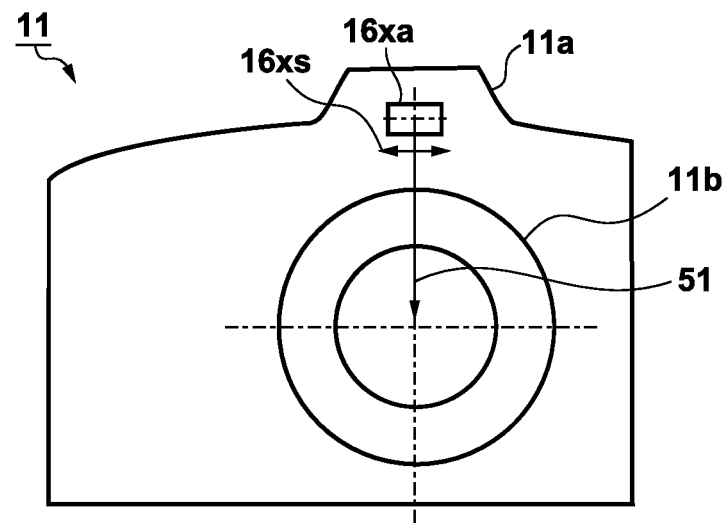
FIGS. 4A and 4B are diagrams for explaining an effect of gravitational acceleration on an X acceleration signal.

FIG. 4A shows a case where the camera 11 is in an upright state (reference posture). In this case, the acceleration detection direction 16xs (horizontal direction) of the second accelerometer 16xa and the direction of gravity 51 are orthogonal to each other, and the X acceleration signal output from the second accelerometer 16xa is not affected by the gravitational acceleration.

Figure 4B:
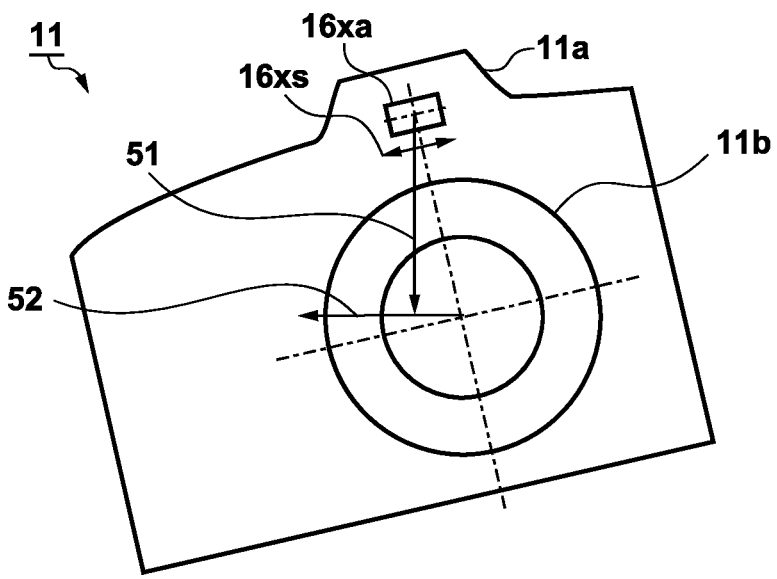

On the other hand, FIG. 4B shows a case where the camera 11 is rotated around the optical axis 10 by a roll shake. In this case, the acceleration detection direction 16xs of the second accelerometer 16xa and the direction of gravity 51 are no longer orthogonal. Here, if the X shake occurs in the direction of an arrow 52, the X acceleration signal output from the second accelerometer 16xa is a signal corresponding to the sum of the X shake acceleration and the gravitational acceleration component. If the X shake occurs in the direction opposite to the arrow 52, the X acceleration signal output from the second accelerometer 16xa is a signal obtained by subtracting the gravitational acceleration component from the X shake acceleration. In which direction the X shake occurs is determined based on the phase relationship between signals from the first angular velocity meter 15rg and the second angular velocity meter 15yg. If the signals are roughly in the opposite phase, the gravitational acceleration component is added to the X acceleration signal from the second accelerometer 16xa, and if the signals are roughly in the same phase, the gravitational acceleration component is subtracted from the X acceleration signal.

Figure 5:
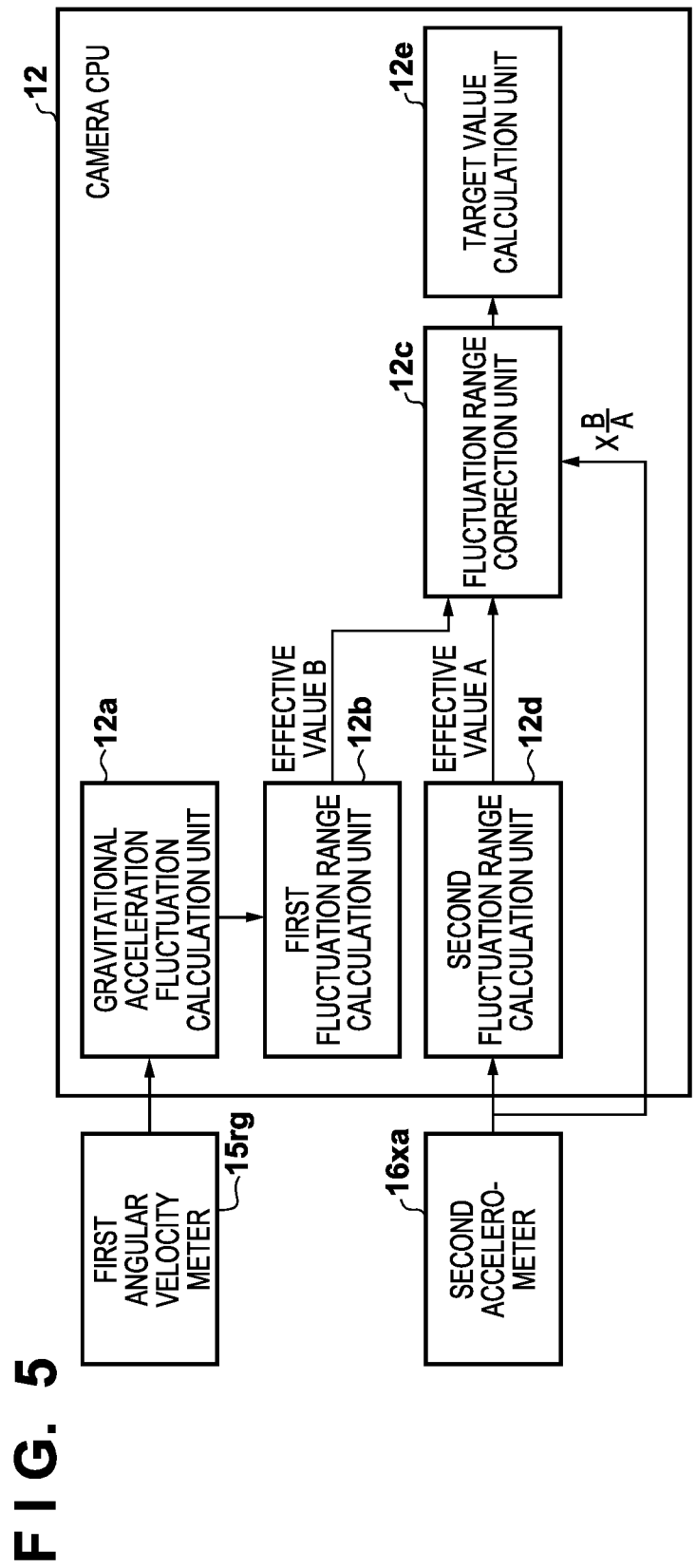
FIG. 5 is a block diagram showing a functional configuration for calculating an X shake reduction target value by reducing a gravitational acceleration component superimposed on an X acceleration signal according to the first embodiment.

FIG. 5 is a block diagram showing a functional configuration for calculating an X shake reduction target value by removing the gravitational acceleration component superimposed on the X acceleration signal output from the second accelerometer 16xa in the first embodiment, and the function is realized by the camera CPU 12 executing a program.

Based on a roll angular velocity signal from the first angular velocity meter 15rg and the initial posture of the camera, a gravitational acceleration fluctuation calculation unit 12a calculates the gravitational acceleration component exerted on the second accelerometer 16xa. A first fluctuation range calculation unit 12b obtains a fluctuation range of the gravitational acceleration component calculated by the gravitational acceleration fluctuation calculation unit 12a. The fluctuation range will be described later. Then, a fluctuation range correction unit 12c reduces the influence of the gravitational acceleration component superimposed on the X acceleration signal output from the second accelerometer 16xa based on the fluctuation range of the gravitational acceleration component obtained by the first fluctuation range calculation unit 12b. The X acceleration signal from the second accelerometer 16xa from which the effect of the gravitational acceleration component is reduced is output to a target value calculation unit 12e and converted to the X shake reduction target value based on the sensitivity of the optical system of the lens 11b and the shooting magnification.

Figure 6A:
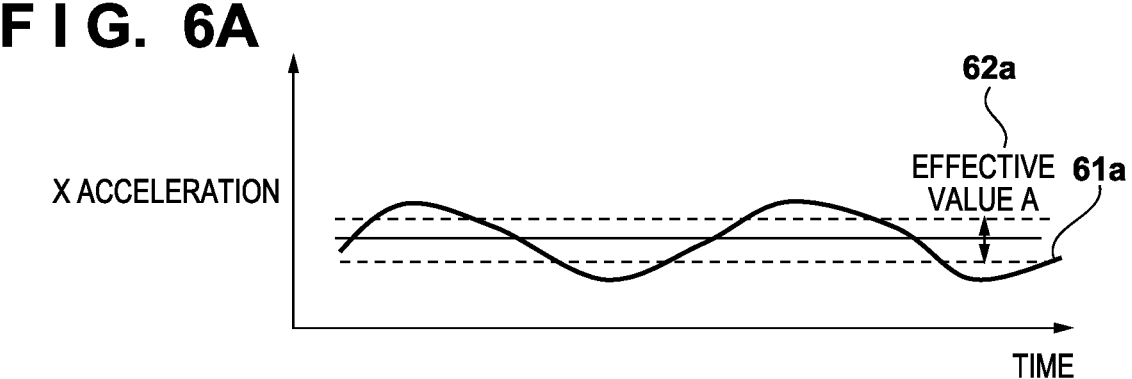
FIGS. 6A to 6C are graphs for explaining the method of obtaining X shake acceleration from which an effect of the gravitational acceleration is reduced according to the first embodiment.
Figure 6B:
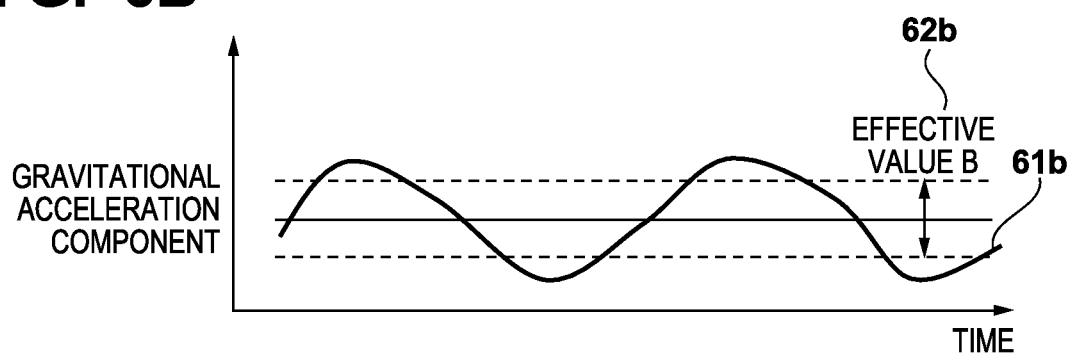
Figure 6C:
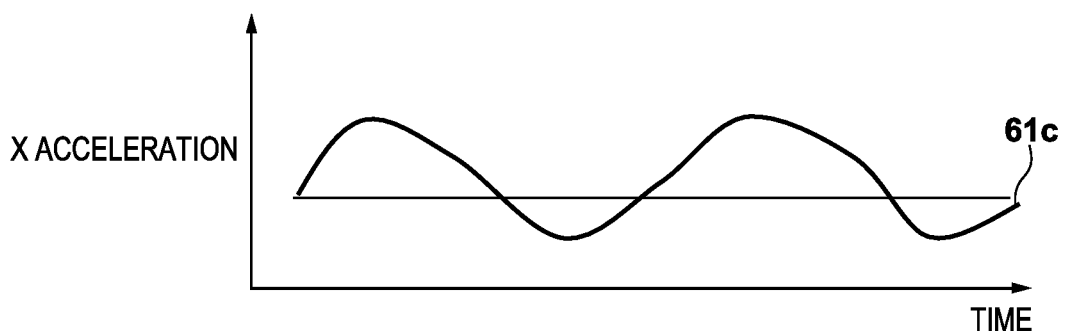

FIGS. 6A to 6C are graphs for explaining a method of reducing the influence of the gravitational acceleration component (error signal) superimposed on the X acceleration signal in the present embodiment, where the horizontal axis represents time and the vertical axis represents acceleration.

A waveform 61a shown in FIG. 6A shows an X acceleration signal output from the second accelerometer 16xa when a roll shake is occurring. As described with reference to FIG. 4B, when the signals from the first angular velocity meter 15rg and the second angular velocity meter 15yg are roughly in the same phase, the direction of the acceleration due to the X shake applied to the second accelerometer 16xa and the direction of the gravitational acceleration are opposite to each other. Therefore, the amplitude of the output X acceleration signal is smaller than the amplitude when there is no effect of gravitational acceleration.

A waveform 61b shown in FIG. 6B shows a gravitational acceleration component output from the gravitational acceleration fluctuation calculation unit 12a, and is a waveform of the gravitational acceleration component exerted on the second accelerometer 16xa and obtained based on the roll angular velocity signal output from the first angular velocity meter 15rg. For example, the gravitational acceleration component shown by the waveform 61b is obtained by calculating an angle formed by the acceleration detection direction 16xs of the second accelerometer 16xa and the direction of gravity 51 using the roll shake rotation angle, obtained by time-integrating the roll angular velocity signal output from the first angular velocity meter 15rg, and the initial posture of the camera.

The present embodiment is characterized in that the effect of gravitational acceleration is obtained by the fluctuation range of acceleration. Since a waveform 61b showing the gravitational acceleration component exerted on the second accelerometer 16xa has an alternating waveform, the first fluctuation range calculation unit 12b obtains an effective value B (for example, root mean square value) 62b of the gravitational acceleration component in the predetermined period (for example, 1 to 5 seconds) of the waveform 61b. Similarly, since a waveform 61a of the X acceleration signal output from the second accelerometer 16xa also has an alternating waveform, a second fluctuation range calculation unit 12d obtains an effective value A 62a of the X acceleration signal in a predetermined period (for example, 1 to 5 seconds) of the waveform 61a.

The effective value A 62a is an amount of alternating fluctuation in which the X shake acceleration and the gravitational acceleration component are combined, and the effective value B 62b is an amount of alternating fluctuation of the gravitational acceleration component. Therefore, the fluctuation range correction unit 12c multiplies the signal waveform 61a of the second accelerometer 16xa by a ratio, the effective value B/effective value A (hereinafter referred to as "B/A"), thereby a waveform 61c of the X shake acceleration shown in FIG. 6C, which corresponds to an output of the second accelerometer 16xa when no roll shake occurs, can be obtained. This waveform 61c is not an ideal X shake acceleration from which the gravitational acceleration component is subtracted from the X acceleration signal, however, it is a reasonable value to be used for calculating a target value for reducing the X shake.

In the conventional method, the accuracy of the angular velocity meter and the accelerometer is low, and when the waveform 61a and the accelerometer 61b are not in phase, there is a possibility that the gravitational acceleration component cannot be removed correctly even if the fluctuation of the gravitational acceleration component is subtracted from a signal from the accelerometer. On the other hand, in the method of the present embodiment, the X acceleration signal output from the second accelerometer 16xa is multiplied by the ratio of the fluctuation range of the gravitational acceleration component with respect to the fluctuation range of the X acceleration signal, and therefore, difference in phase between the waveform 61a and the accelerometer 61b does not cause a problem. Therefore, the X shake acceleration waveform 61c can be stably obtained. The signal obtained in this way is input to the target value calculation unit 12e.

In the present embodiment, the fluctuation ranges of the X acceleration signal and the gravitational acceleration component are obtained from the root-mean-squared effective value A and effective value B, but they may be obtained using another method. For example, they may be obtained from the maximum and minimum values of the waveforms 61a and 61b within a predetermined period in FIGS. 6A to 6C, the areas of the waveforms 61a and 61b within a predetermined period, the discrete Fourier transform values of a predetermined frequency, or the like. Then, by multiplying the X acceleration signal by the ratio of the fluctuation range of the gravitational acceleration component with respect to the fluctuation range of the obtained X acceleration signal, the gravitational acceleration component superimposed on the X acceleration signal output from the second accelerometer 16xa can be reduced.

The target value calculation unit 12e performs, for example, the double integration on the X shake acceleration input from the fluctuation range correction unit 12c to obtain an X shake displacement, and calculates the X shake reduction target value based on the sensitivity and shooting magnification of the imaging optical system 13. Then, the actuator 14b moves the image sensor 14 in the direction of the arrow 14x based on the calculated X shake reduction target value to reduce the deviation of the image plane due to the X shake.

FIG. 7 is a flowchart showing a method of reducing X shake in the first embodiment, and starts when the power of the camera 11 is turned on.

In step S101, the gravitational acceleration fluctuation calculation unit 12a obtains the gravitational acceleration component exerted on the second accelerometer 16xa from the roll angular velocity signal output from the first angular velocity meter 15rg, and outputs it to the first fluctuation range calculation unit 12b. At the same time, the X acceleration signal output from the second accelerometer 16xa is input to the second fluctuation range calculation unit 12d.

In step S102, the first fluctuation range calculation unit 12b integrates the gravitational acceleration component and the second fluctuation range calculation unit 12d integrates the X acceleration signal for a predetermined period (for example, 1 second).

In step S103, the first fluctuation range calculation unit 12b and the second fluctuation range calculation unit 12d obtain the effective value B of the integrated gravitational acceleration component and the effective value A of the integrated X acceleration signal, respectively.

In step S104, the process is returned to step S101 until the photographer gives a shooting instruction, and the calculation of the effective value A and the effective value B is repeated. Upon repeating the loop from step S101 to step S104, the accuracy of each effective value may be improved by taking moving averages of the effective values A and the effective values B obtained every second, for example, before the exposure starts. Further, if the period from turning on the power of the camera to the start of exposure is less than 1 second, the accuracy of the effective value A and the effective value B cannot be improved, so the X shake compensation in step S106 described later may not be performed.

When the exposure starts in step S104, the process proceeds to step S105.

In step S105, the fluctuation range correction unit 12c multiplies the X acceleration signal from the second accelerometer 16xa by the ratio B/A of the effective value B to the effective value A obtained in step S103, thereby corrects the X acceleration signal to the X shake acceleration corresponding to the signal from which the gravitational acceleration component is removed, and outputs a signal of the obtained X shake acceleration.

In step S106, the target value calculation unit 12e converts the X shake acceleration signal output from the fluctuation range correction unit 12c into the X shake displacement, etc., and also obtains the X shake reduction target value by using the sensitivity and shooting magnification of the imaging optical system. Then, the obtained X shake reduction target value is output to the actuator 14b, and by actuating the image sensor 14 in the direction of the arrow 14x, the deviation of the image plane caused by the X shake is reduced.

In step S107, it is determined whether the exposure is completed, and the process returns to step S105 and the X shake reduction is continued until the end of the exposure. When the exposure is completed, the process returns to step S101.

As described above, according to the first embodiment, even if the signals output from the angular velocity meter that detects the roll shake and from the accelerometer that detects the translational shake in the X direction are out of phase, it is possible to compensate the gravitational acceleration component caused by the roll shake and exerted on the accelerometer in a short time. This makes it possible to stably reduce the influence of the gravitational acceleration component superimposed on the translational shake in the X direction.

Second Embodiment

Next, a second embodiment of the present invention will be described.

Figure 8:
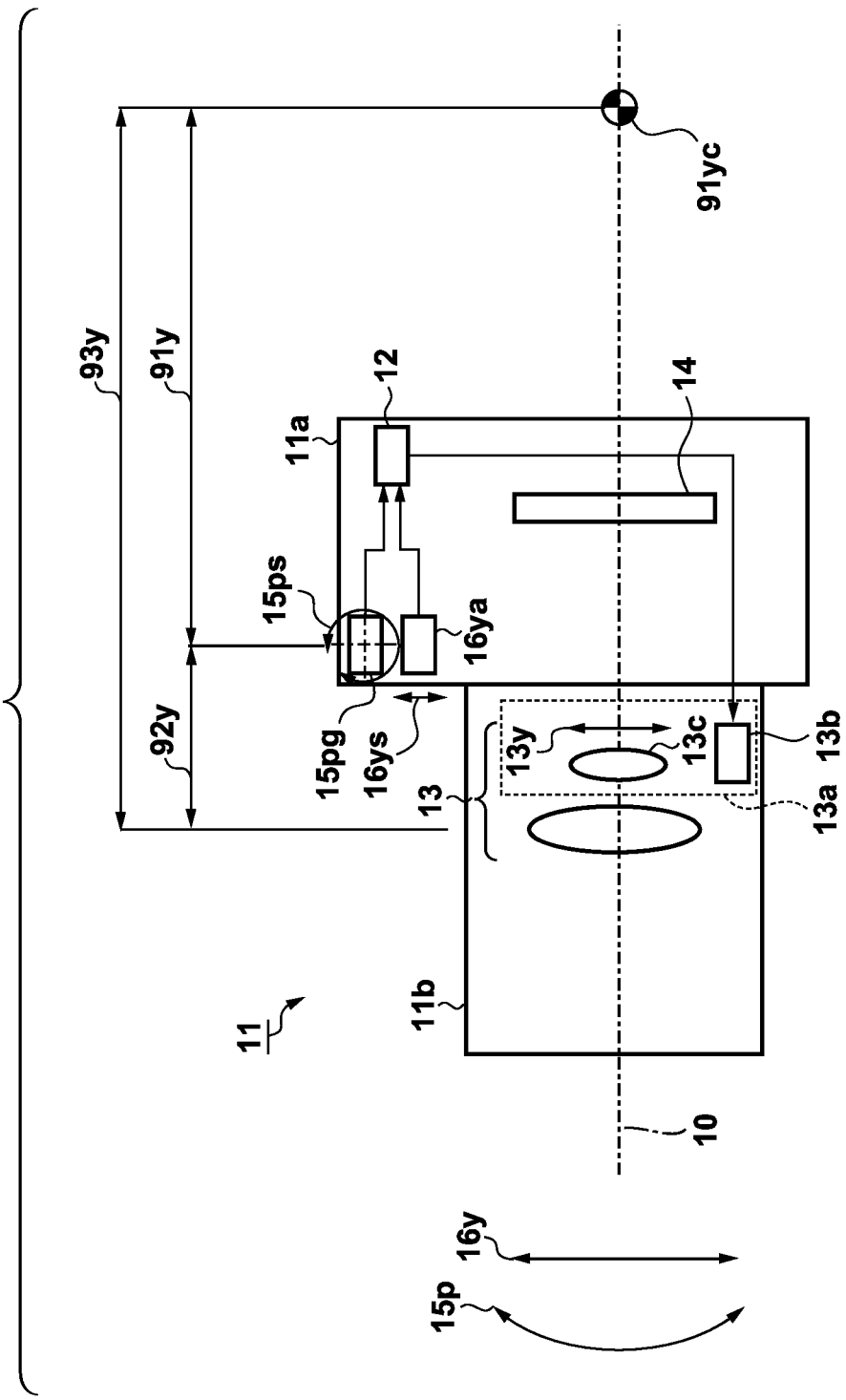
FIG. 8 is a side view of a camera according to a second embodiment.
Figure 9:
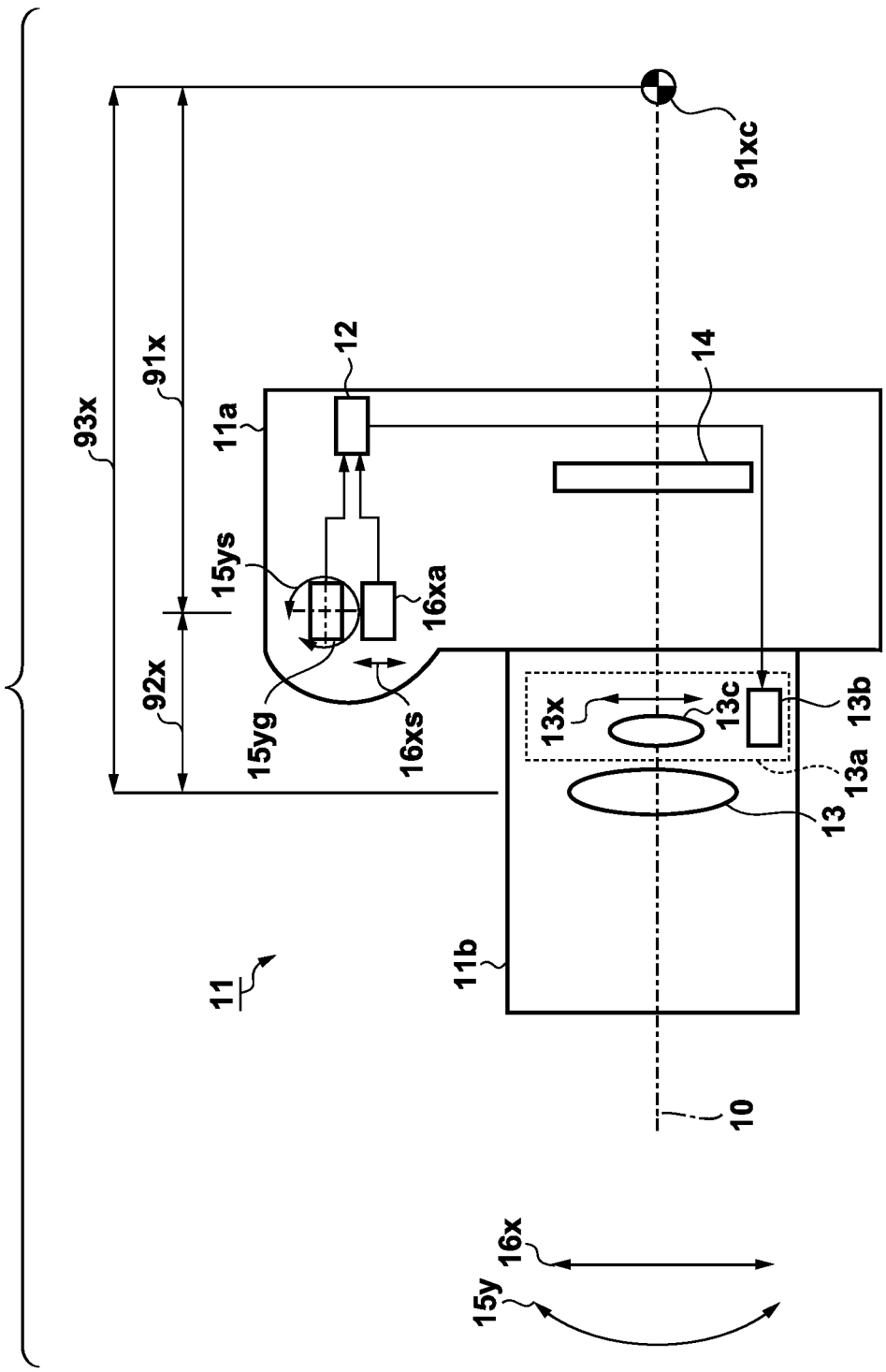
FIG. 9 is a top view of the camera according to the second embodiment.

FIG. 8 is a side view of the camera 11 in the second embodiment, and FIG. 9 is a top view of the camera 11. Compared with the configurations shown in FIGS. 1 and 2, the configuration shown in FIGS. 8 and 9 further has an image stabilization unit 13a for actuating a lens 13c which is a part of the imaging optical system 13 using an actuator 13b in the directions of arrows 13x and 13y instead of the image stabilization unit 14a that actuates the image sensor 14 using the actuator 14b. Since the configurations other than above are the same as those in FIGS. 1 and 2, the same reference numerals are assigned and the description thereof will be omitted.

Since the front view of the camera 11 is the same as that of FIG. 3, the description thereof is omitted here.

The method of reducing Y shake in the camera 11 having the configuration shown in FIG. 8 is different from the reduction method described in the first embodiment. Hereinafter, the method of reducing Y shake in the second embodiment will be described.

First, the Y acceleration signal in the direction of the arrow 16ys obtained from the third accelerometer 16ya and/or the pitch angular velocity signal in the direction of the arrow 15ps obtained from the third angular velocity meter 15pg are converted so as to be expressed in the same unit, and the ratio between them is calculated. As a result, a radius of gyration 91y from the third accelerometer 16ya to an axis of rotation 91yc of Y shake is obtained. Next, a preset radius of gyration 92y from the third accelerometer 16ya to the principal point of the optical system is added to the obtained radius of gyration 91y to obtain a true radius of gyration 93y. Finally, by multiplying the pitch angular velocity signal output from the third angular velocity meter 15pg by the true radius of gyration 93y, the Y shake in the direction of the arrow 16y is obtained.

A method of reducing X shake is the same as the method of reducing Y shake. First, the X acceleration signal in the direction of the arrow 16xs obtained from the second accelerometer 16xa and/or the yaw angular velocity signal in the direction of the arrow 15ys obtained from the second angular velocity meter 15yg are converted so as to be expressed in the same unit, and the ratio between them is calculated. As a result, a radius of gyration 91x from the second accelerometer 16xa to the axis of rotation 91xc is obtained. Next, a preset radius of gyration 92x from the second accelerometer 16xa to the principal point of the optical system is added to the obtained radius of gyration 91x to obtain a true radius of gyration 93x. Finally, by multiplying the yaw angular velocity signal output from the second angular velocity meter 15yg by the true radius of gyration 93x, the X shake in the direction of the arrow 16x is obtained.

In this way, once the true radii of gyration 93x and 93y are known, the X shake amount and Y shake amount are stably obtained by only using the angular velocity signal from the angular velocity meter without using a signal from an accelerometer signal.

Figure 10:
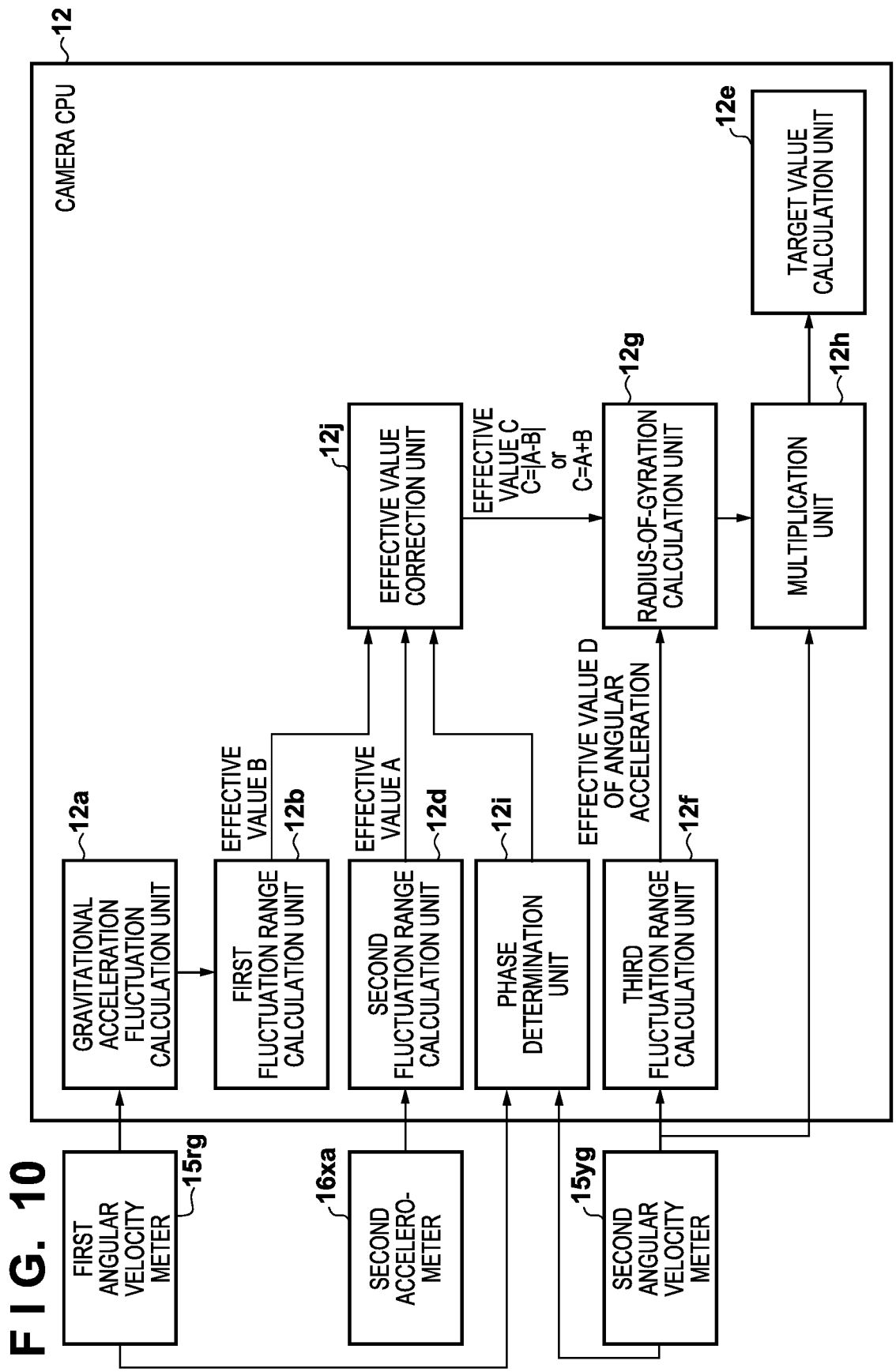
FIG. 10 is a block diagram showing a functional configuration for calculating an X shake reduction target value by reducing a gravitational acceleration component superimposed on an X acceleration signal according to the second embodiment.

FIG. 10 is a block diagram showing a functional configuration for reducing the gravitational acceleration component superimposed on the X acceleration signal output from the second accelerometer 16xa and calculating the X shake reduction target value in the second embodiment, and the function is realized by the camera CPU 12 executing a program. In addition, in FIG. 10, the same reference numerals are given to the constituents as those having the same functions in FIG. 5. Further, FIGS. 11A to 11E are graphs for explaining a method of obtaining an X shake velocity from which the influence of gravitational acceleration caused by roll shake is reduced in the present embodiment.

Figure 11A:
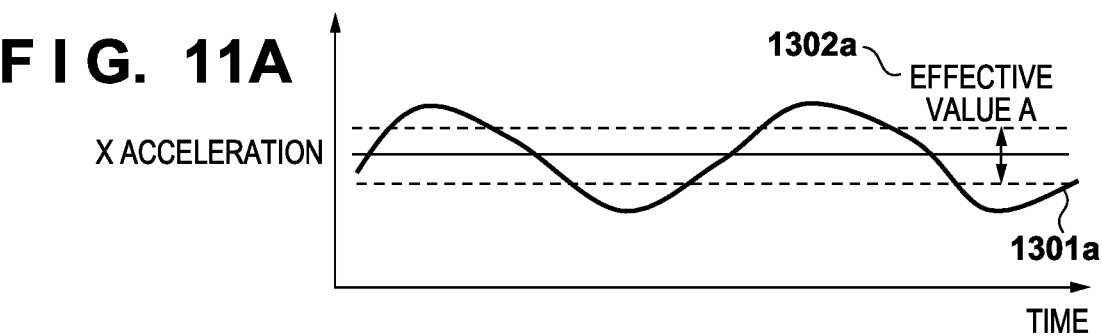
FIGS. 11A to 11E are graphs for explaining the method of obtaining X shake acceleration from which an effect of the gravitational acceleration is reduced according to the second embodiment.
Figure 11B:
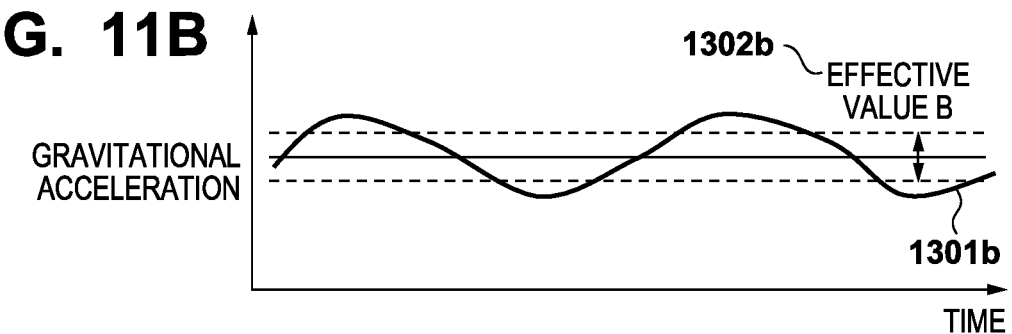

FIG. 11B shows a waveform 1301b of the gravitational acceleration component in the X direction obtained by the gravitational acceleration fluctuation calculation unit 12a from the output of the first angular velocity meter 15rg. Based on this gravitational acceleration component, the first fluctuation range calculation unit 12b obtains an effective value B 1302b of the gravitational acceleration component superimposed on the X acceleration signal due to a roll shake. The method of obtaining the effective value B 1302b is the same as that described in the first embodiment. Further, FIG. 11A shows a waveform 1301a of the X acceleration signal output from the second accelerometer 16xa, and based on this X acceleration signal, the second fluctuation range calculation unit 12d obtains an effective value A 1302a that includes the gravitational acceleration component due to a roll shake. The method of obtaining the effective value A 1302a is the same as that described in the first embodiment.

Figure 11C:
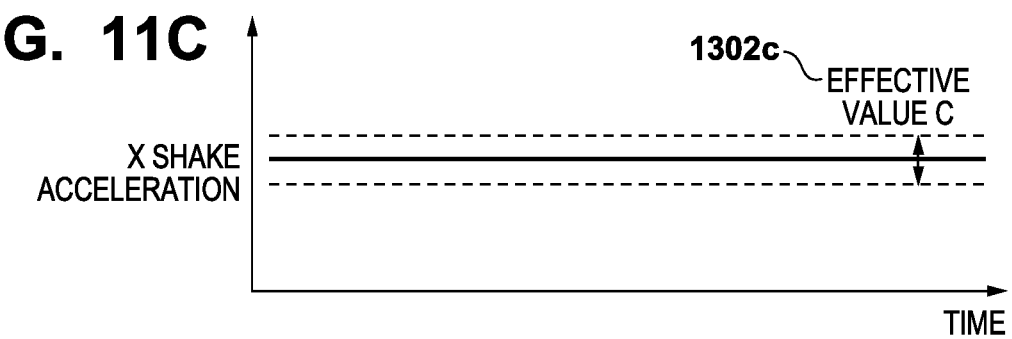

FIG. 11C shows an effective value C 1302c of the X shake acceleration obtained by an effective value correction unit 12j using the effective value A 1302a and the effective value B 1302b when there is no influence of the gravitational acceleration fluctuation. As described with reference to FIG. 4B, whether the gravitational acceleration component is added to or subtracted from the X shake acceleration is determined by the phase relationship between a signal from the first angular velocity meter 15rg and a signal from the second angular velocity meter 15yg. A phase determination unit 12i determines whether the phases of the signals from the first angular velocity meter 15rg and the second angular velocity meter 15yg are roughly in phase or in opposite phase, and outputs the determined result to the fluctuation range correction unit 12c. The phase is determined to be in phase, for example, if the phase difference between the signals of the first angular velocity meter 15rg and the second angular velocity meter 15yg is within a predetermined range, and if not, the phase is determined to be in opposite phase.

The effective value correction unit 12j sets the absolute value of the difference between the effective value A 1302a and the effective value B 1302b as the effective value C 1302c if the phase determination unit 12i determined that the signals are in phase, and if the phase determination unit 12i determined that the signals are in opposite phase, the effective value correction unit 12j sets the sum of effective value A 1302a and the effective value B 1302b as the effective value C 1302c.

Figure 11D:
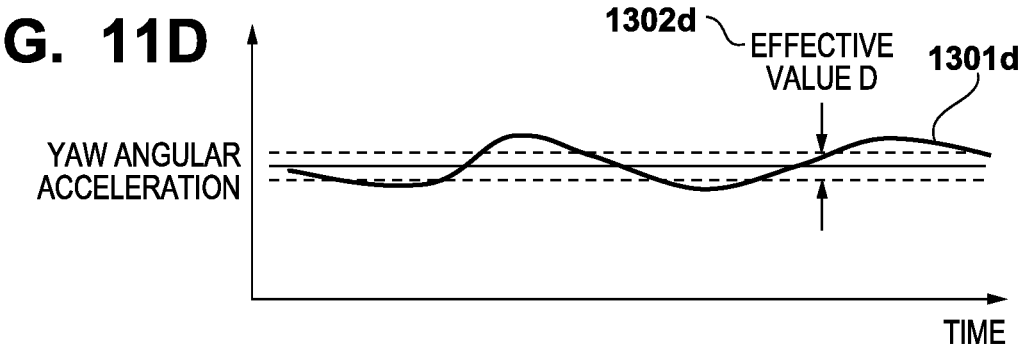

On the other hand, a third fluctuation range calculation unit 12f differentiates the yaw angular velocity signal output from the second angular velocity meter 15yg, converts it into a waveform 1301d showing yaw angular acceleration as shown in FIG. 11D, and then obtains an effective value D 1302d of a yaw shake. The method of obtaining the effective value D 1302d is the same as the method of obtaining the effective value A 1302a and the effective value B 1302b. Here, the reason of differentiating the yaw angular velocity signal to be converted into the yaw angular acceleration is to have the same unit as the unit of the X acceleration signal.

A radius-of-gyration calculation unit 12g obtains the radius of gyration 91x shown in FIG. 9 by obtaining a ratio between the effective value C 1302c of the X shake acceleration input from the effective value correction unit 12j and the effective value D 1302d of the yaw angular acceleration input from the third fluctuation range calculation unit 12f. Next, the known radius of gyration 92x is added to the radius of gyration 91x to obtain the true radius of gyration 93x.

Figure 11E:
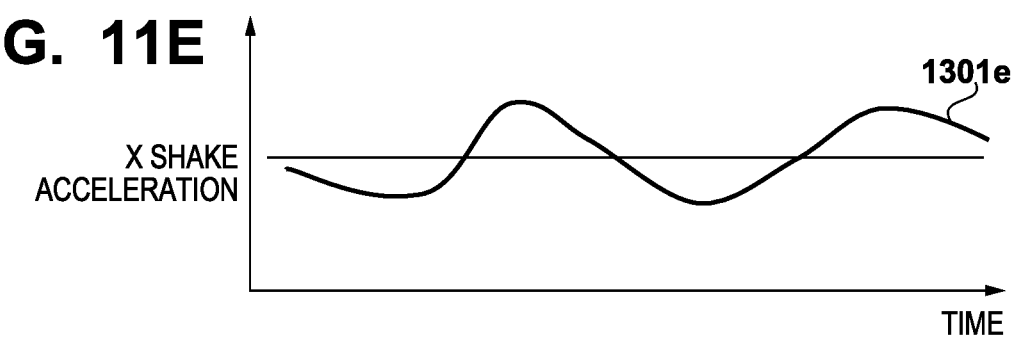

A multiplication unit 12h multiplies the true radius of gyration 93x obtained by the radius-of-gyration calculation unit 12g by the yaw angular velocity signal output from the second angular velocity meter 15yg to obtain an X shake velocity 1301e shown in FIG. 11E. The target value calculation unit 12e obtains the X shake reduction target value based on the signal of the multiplication unit 12h and the sensitivity and the shooting magnification of the optical system of the lens 11b, and outputs the X shake reduction target value to the actuator 13b.

Figure 12:
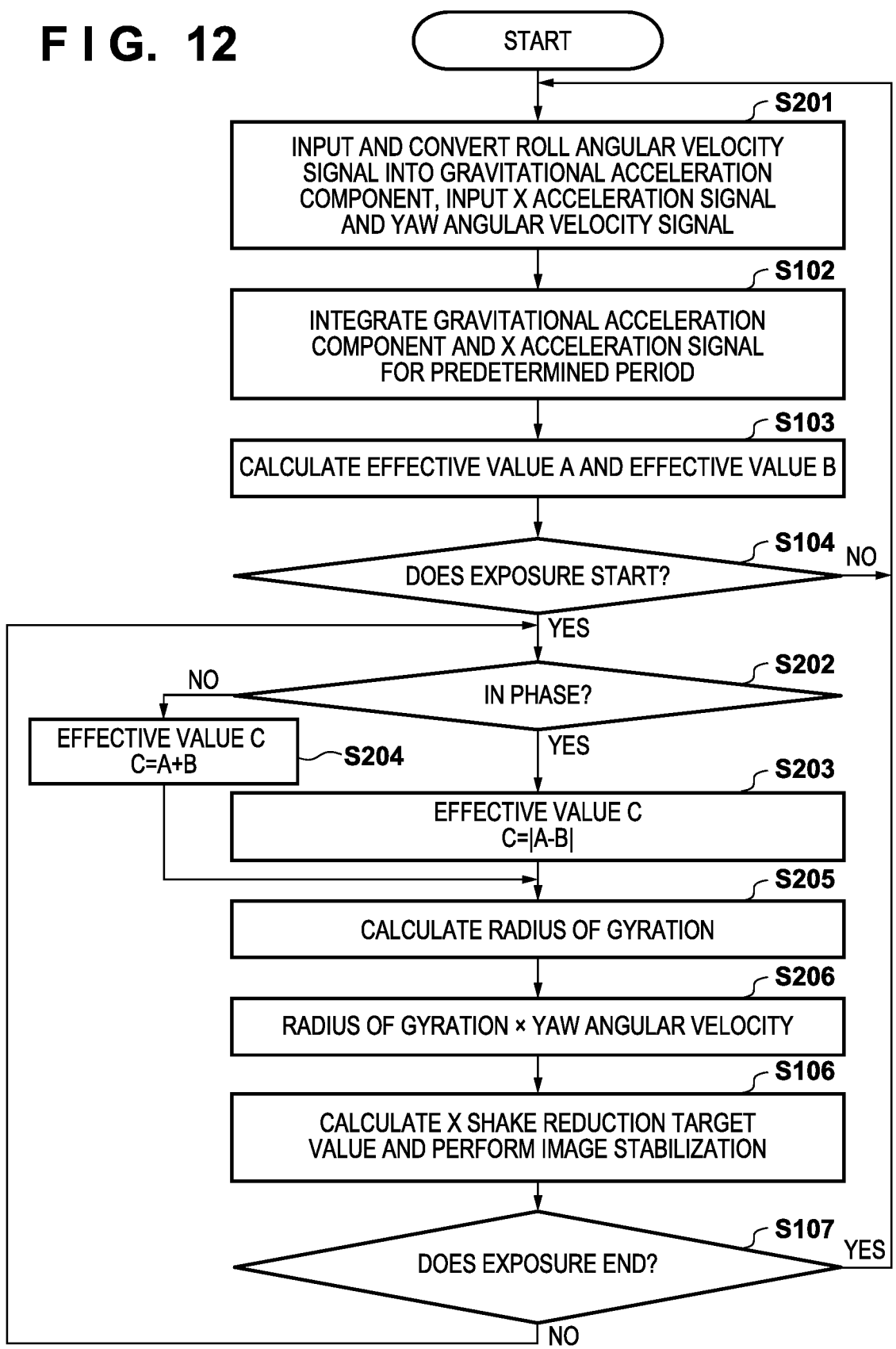
FIG. 12 is a flowchart showing a method of reducing X shake according to the second embodiment.

FIG. 12 is a flowchart showing a method of reducing X shake in the second embodiment, and starts when the power of the camera 11 is turned on. The same processes as those in the flowchart of FIG. 7 are assigned the same step numbers, and the description thereof will be omitted as appropriate.

In the second embodiment, in step S201, the gravitational acceleration fluctuation calculation unit 12a finds the gravitational acceleration component exerted on the second accelerometer 16xa from the roll angular velocity signal output from the first angular velocity meter 15rg, and outputs it to the first fluctuation range calculation unit 12b. At the same time, the X acceleration signal output from the second accelerometer 16xa is input to the second fluctuation range calculation unit 12d, and the roll angular velocity signal output from the first angular velocity meter 15rg and the yaw angular velocity signal output from the second angular velocity meter 15yg are input to the phase determination unit 12i.

After that, the X acceleration signal and the gravitational acceleration component signal are integrated in step S102, respectively, and the effective value A and the effective value B are obtained in step S103.

When the exposure is started in step S104, the process proceeds to step S202. In step S202, the phase determination unit 12i determines whether the roll angular velocity signal and the yaw angular velocity signal input in step S201 are substantially in phase or in opposite phase. If the signals are substantially in phase, the process proceeds to step S203, and if the signals are substantially in opposite phase, the process proceeds to step S204.

In step S203, the effective value correction unit 12j calculates the absolute value of the difference between the effective value A and the effective value B, and sets it as the effective value C when the signals are in phase. On the other hand, in step S204, the sum of the effective value A and the effective value B is calculated and set as the effective value C when the signals are in opposite phase.

Next, in step S205, the third fluctuation range calculation unit 12f calculates the effective value D of yaw angular acceleration from the yaw angular velocity signal output from the second angular velocity meter 15yg, and the radius-of-gyration calculation unit 12g calculates the radius of gyration of the yaw shake from the ratio between the effective value C and the effective value D. Then, in step S206, the multiplication unit 12h multiplies the yaw angular velocity signal output from the second angular velocity meter 15yg by the radius of gyration obtained in step S205 to generate an X shake velocity corresponding to a signal from which the gravitational acceleration component is reduced, and output the signal.

In step S106, the target value calculation unit 12e converts the X shake velocity signal output from the multiplication unit 12h into X shake displacement, etc., and also obtains the X shake reduction target value using the sensitivity and the imaging magnification of the imaging optical system. Then, the obtained X shake reduction target value is output to the actuator 13b, and by actuating the lens 13c in the direction of the arrow 13x, the deviation of the image plane due to the X shake is reduced.

In step S107, it is determined whether the exposure is completed, and the process returns to step S202 and the X shake reduction is continued until the end of the exposure. When the exposure is completed, the process returns to step S101.

As described above, according to the second embodiment, upon reducing the X shake by using the yaw angular velocity signal, the influence of the gravitational acceleration caused by the roll shake and exerted on the second accelerometer 16xa can be stably reduced.

Third Embodiment

Next, a third embodiment of the present invention will be described.

Figure 13:
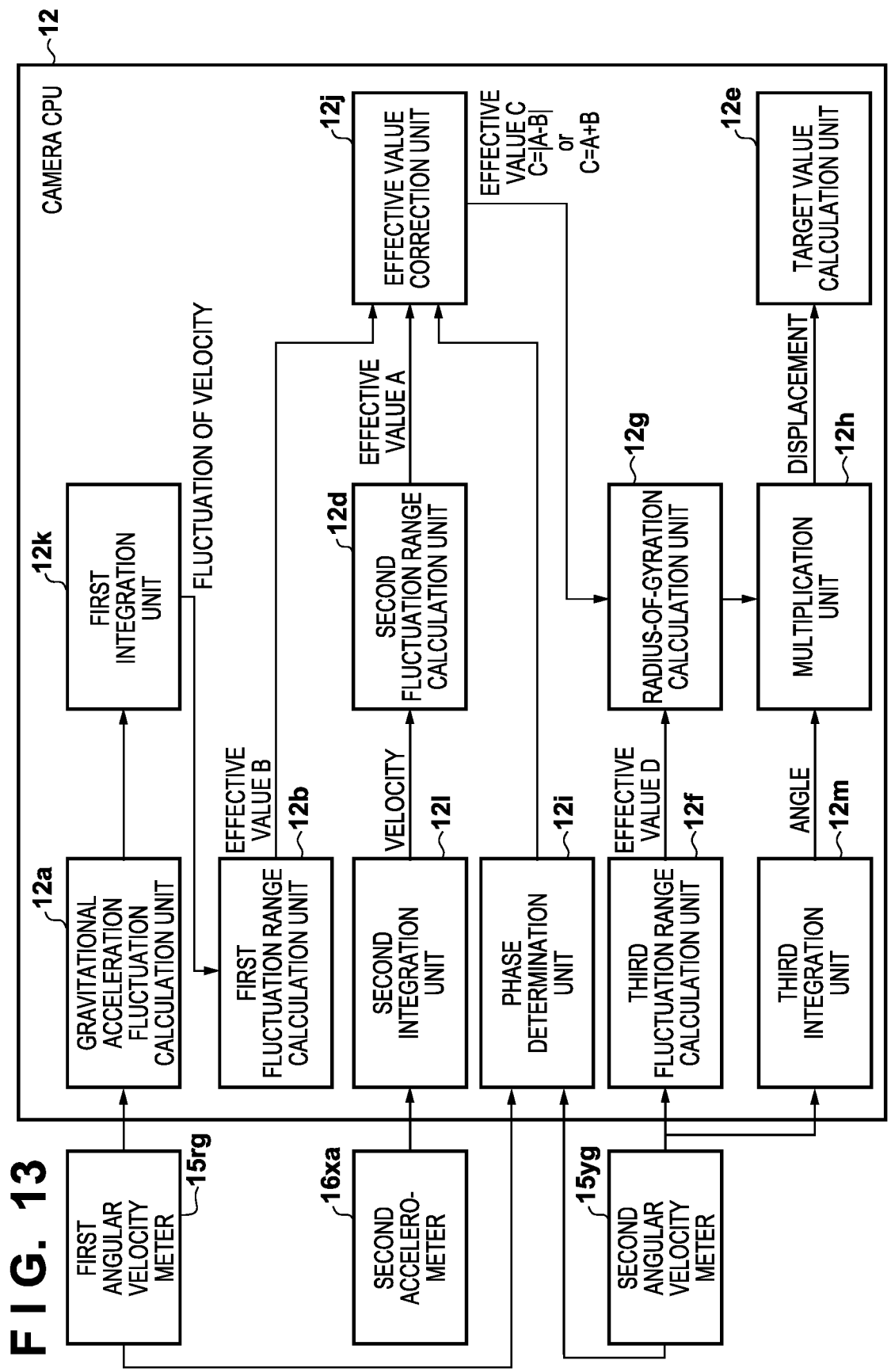
FIG. 13 is a block diagram showing a functional configuration for calculating an X shake reduction target value by reducing a gravitational acceleration component superimposed on an X acceleration signal according to a third embodiment.

FIG. 13 is a block diagram showing a functional configuration for reducing the gravitational acceleration component superimposed on an X acceleration signal output from the second accelerometer 16xa and calculating an X shake reduction target value in the third embodiment, and the function is realized by the camera CPU 12 executing a program. In the configuration shown in FIG. 13, a first integration unit 12k, a second integration unit 12l, and a third integration unit 12m are further provided in the configuration shown in FIG. 10. In the third embodiment, the effective values are obtained from velocities using these constituents.

Since the configuration of the camera 11 is the same as that described with reference to FIGS. 8, 9 and 3 in the second embodiment, the description thereof is omitted here.

The first integration unit 12k integrates to convert the gravitational acceleration component exerted on the second accelerometer 16xa and output from the gravitational acceleration fluctuation calculation unit 12a into a gravitational velocity component. That is, a velocity error of the fluctuation of the gravitational acceleration component generated by the roll shake is obtained. Then, the first fluctuation range calculation unit 12b obtains the effective value B of the fluctuation range of the gravitational velocity component which is the velocity error.

The second integration unit 12l integrates to convert the X acceleration signal output from the second accelerometer 16xa into an X velocity signal (translational shake signal). The X velocity signal converted here is a signal in which the velocity error due to the fluctuation of the gravitational acceleration component is superimposed on the velocity of the X shake. Then, the second fluctuation range calculation unit 12d calculates the effective value A of the fluctuation range of the X shake velocity signal on which the velocity error is superimposed. In this way, by integrating the gravitational acceleration component and the X acceleration signal and then obtaining the effective values, it is possible to obtain the effective values A and B with less influence of noise and with high accuracy.

The radius-of-gyration calculation unit 12g finds the ratio between the effective value C output from the effective value correction unit 12j and the effective value D of the yaw angular velocity signal output from the third fluctuation range calculation unit 12f, thereby obtaining the radius of gyration 91x shown in FIG. 9. In the third embodiment, unlike the second embodiment, the third fluctuation range calculation unit 12f obtains the effective value D of the yaw angular velocity signal without differentiating the yaw angular velocity signal.

The third integration unit 12m integrates to convert the yaw angular velocity signal from the second angular velocity meter 15yg into an angular signal (rotational shake signal). Then, the multiplication unit 12h multiplies the angular signal input from the third integration unit 12m by the radius of gyration obtained from the radius-of-gyration calculation unit 12g to obtain the X shake displacement, and outputs it to the target value calculation unit 12e.

Note that it is possible to further improve the accuracy of the effective values A and B by adding high-pass filter to each of the first integration unit 12k, second integration unit 12l, and third integration unit 12m to remove extremely low frequency noise.

Figure 14:
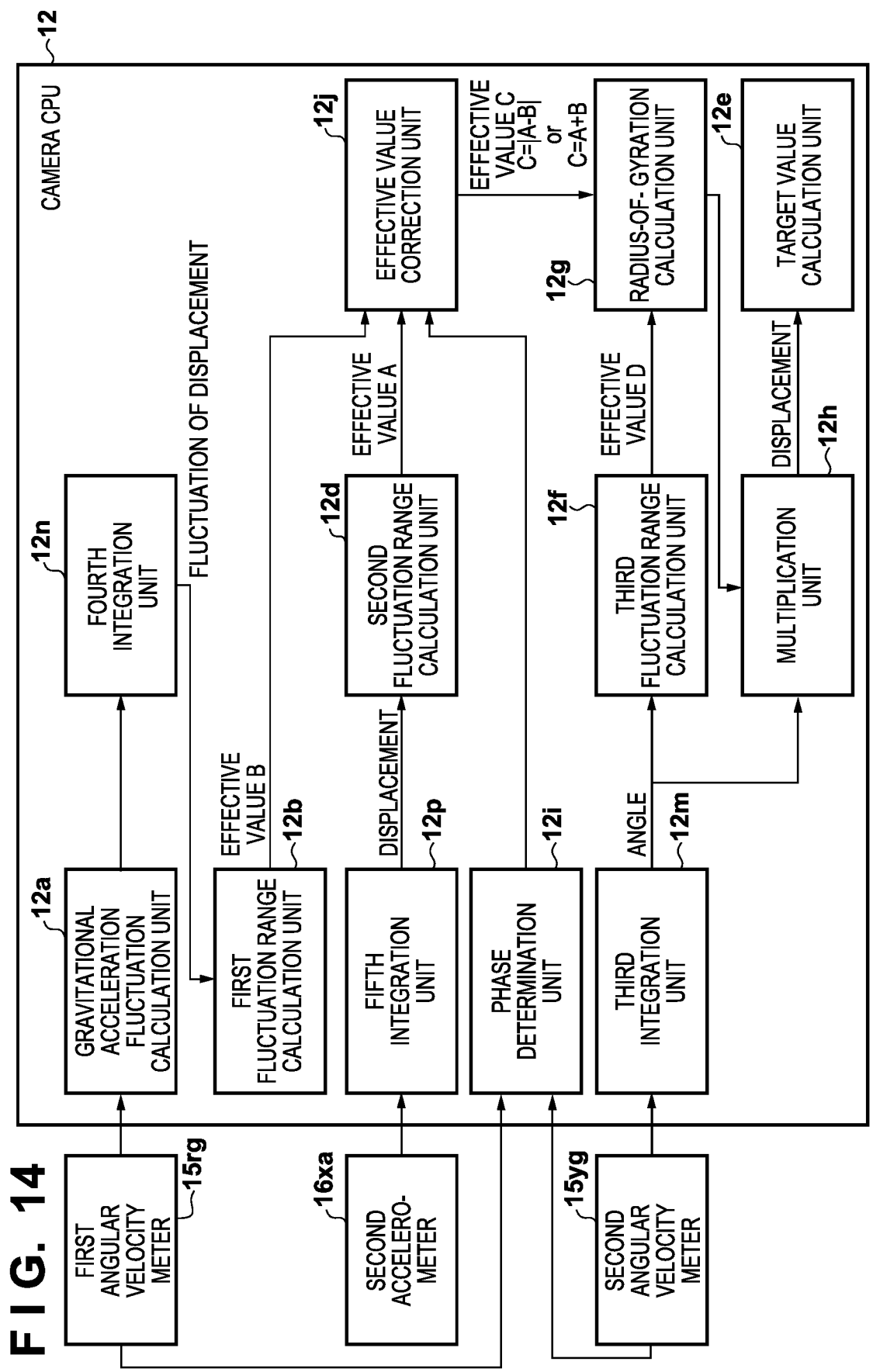
FIG. 14 is a block diagram showing a functional configuration for calculating an X shake reduction target value by reducing a gravitational acceleration component superimposed on an X acceleration signal according to a modification of the third embodiment.

FIG. 14 is a block diagram showing another configuration for calculating the X shake reduction target value in the third embodiment. The difference between the configuration shown in FIG. 14 and the configuration shown in FIG. 13 is that the first integration unit 12k and the second integration unit 12l are replaced by a fourth integration unit 12n and a fifth integration unit 12p, respectively, and the fourth integration unit 12n performs double integration on the gravitational acceleration component exerted on the second accelerometer 16xa and output from the gravitational acceleration fluctuation calculation unit 12a to convert it into the fluctuation of the displacement. That is, the displacement error of the fluctuation of the gravitational acceleration component caused by the roll shake is obtained. Then, the first fluctuation range calculation unit 12b calculates the effective value B of the fluctuation range of a displacement component, which is the displacement error.

In addition, the fifth integration unit 12p performs double integration on the X acceleration signal from the second accelerometer 16xa to convert it into a displacement signal (amount of translational shake). The displacement converted here is a signal in which the displacement error due to the fluctuation of the gravitational acceleration component is superimposed on the displacement of the X shake. Then, the second fluctuation range calculation unit 12d calculates the effective value A of the fluctuation range of the displacement of the X shake on which the displacement error is superimposed. In this way, by performing double integration on the gravitational acceleration component and the X acceleration signal and then obtaining the effective value in terms of displacement, it is possible to obtain the effective values A and B with low influence of noise and with high accuracy.

The third integration unit 12m integrates to convert the yaw angular velocity signal from the second angular velocity meter 15yg into an angular signal (rotational shake signal), and the third fluctuation range calculation unit 12f obtains the effective value D of the angular signal. The radius-of-gyration calculation unit 12g obtains the gyration 91x shown in FIG. 9 by finding the ratio between the effective value C input from the effective value correction unit 12j and the effective value D input from the third fluctuation range calculation unit 12f. Then, the multiplication unit 12h multiplies to convert the angular signal input from the third integration unit 12m by the radius of gyration into an X shake displacement, and then outputs it to the target value calculation unit 12e.

As described above, according to the third embodiment, the signal obtained from each angular velocity meter and the accelerometer is converted into a velocity signal or a displacement signal, and then the effective value is obtained, thereby the effective value which is less influenced by noise and with high accuracy can be obtained.

Fourth Embodiment

Next, a fourth embodiment of the present invention will be described.

Figure 15:
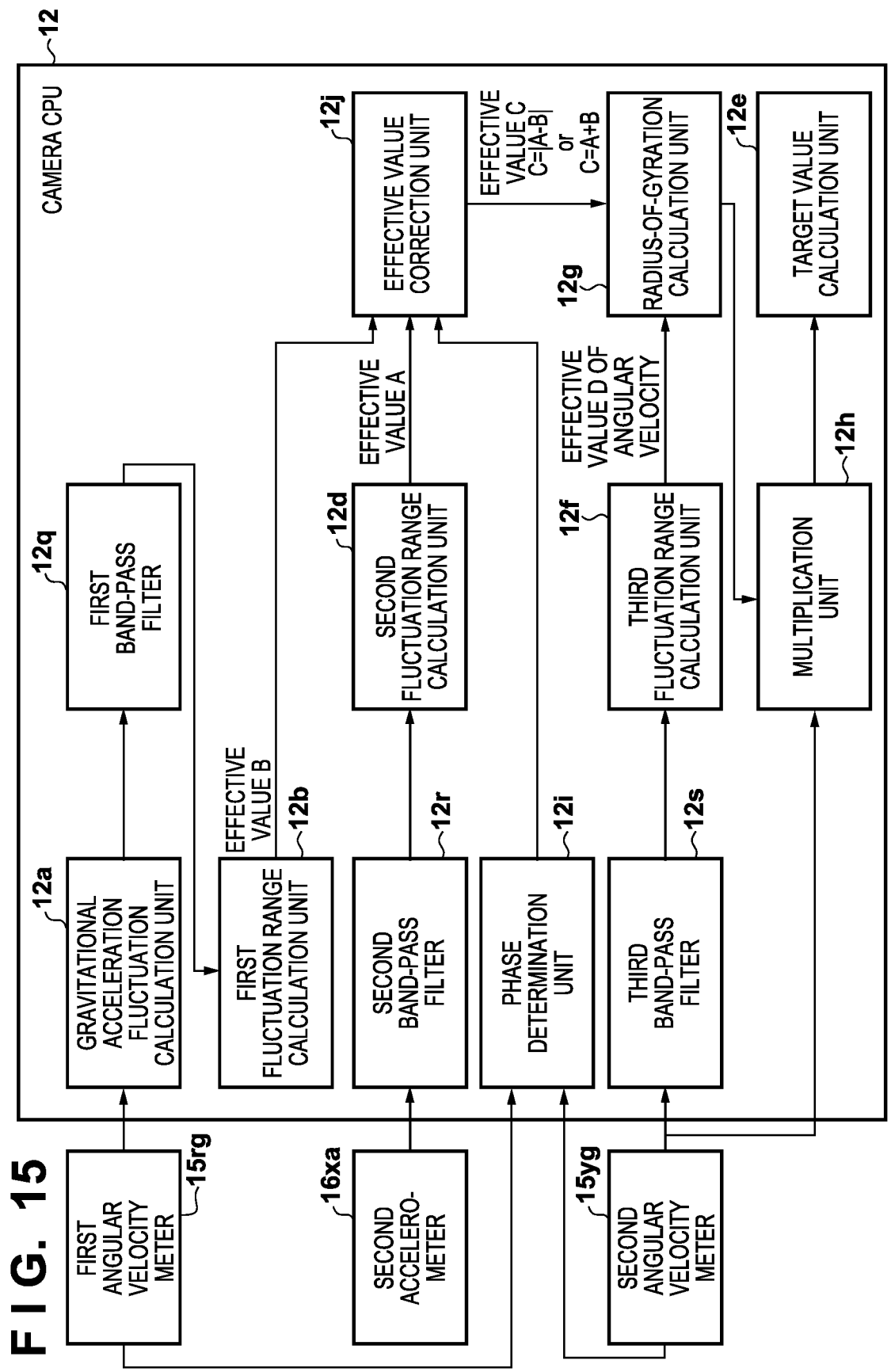
FIG. 15 is a block diagram showing a functional configuration for calculating an X shake reduction target value by reducing a gravitational acceleration component superimposed on an X acceleration signal according to a fourth embodiment.

FIG. 15 is a block diagram showing a functional configuration for reducing the gravitational acceleration component superimposed on an X acceleration signal output from the second accelerometer 16xa and calculating an X shake reduction target value in the fourth embodiment, and the function is realized by the camera CPU 12 executing a program. The configuration shown in FIG. 15 is a configuration in which band-pass filters 12q, 12r, and 12s for extracting signals of a specific frequency from input signals are added to the configuration shown in FIG. 10.

Since the configuration of the camera 11 is the same as that described with reference to FIGS. 8, 9 and 3 in the second embodiment, the description thereof is omitted here.

The first band-pass filter 12q extracts a signal having a predetermined frequency (for example, 2 Hz) from the gravitational acceleration component exerted on the first angular velocity meter 15rg and output from the gravitational acceleration fluctuation calculation unit 12a. Similarly, the second band-pass filter 12r extracts a signal having the same frequency as the first band-pass filter 12q from the X acceleration signal output from the second accelerometer 16xa. Further, the third band-pass filter 12s extracts a signal having the same frequency as the first band-pass filter 12q from the yaw angular velocity signal output from the second angular velocity meter 15yg.

Since the processing after extracting the signal having the predetermined frequency from each signal is the same as the processing described in the second embodiment with reference to FIG. 10, the description thereof is omitted here.

The noise superimposed on the roll angular velocity signal and the X acceleration signal can be attenuated by the first and second band-pass filters 12q and 12r. As a result, the effective value A and the effective value B at the frequency at which X shake is likely to occur (for example, 2 Hz) can be stably calculated. Further, the third band-pass filter 12s also attenuates the noise superimposed on the yaw angular velocity signal, so that the third fluctuation range calculation unit 12f can stably calculate the effective value D. This makes it possible for the radius-of-gyration calculation unit 12g to obtain a highly accurate radius of gyration.

Also in the configurations described with reference to FIGS. 13 and 14, by extracting only signals of the predetermined frequency from the signals output from the first angular velocity meter 15rg, the second accelerometer 16xa, and the second angular velocity meter 15yg by using the band-pass filters as in FIG. 15, the effective values A, B, and D can be stably obtained.

Note that each band-pass filter may extract signals of a plurality of frequencies (for example, 0.5 Hz, 2 Hz, 5 Hz) instead of extracting signals of a single frequency (for example, 2 Hz), and effective values A, B and D may be calculated for each frequency. In that case, by using the average value of the effective values obtained at respective frequencies or the largest effective value, it is possible to perform highly accurate image stabilization.

As described above, according to the fourth embodiment, the effective values can be obtained more stably by using band-pass filters that extract signals of a predetermined frequency.

Fifth Embodiment

Next, a fifth embodiment of the present invention will be described.

FIG. 16 is a block diagram showing a functional configuration for reducing the gravitational acceleration component superimposed on an X acceleration signal output from the second accelerometer 16xa and calculating an X shake reduction target value in the fifth embodiment, and the function is realized by the camera CPU 12 executing a program.

Since the configuration of the camera 11 is the same as that described with reference to FIGS. 8, 9 and 3 in the second embodiment, the description thereof is omitted here.

The difference between FIGS. 16 and 15 lies in the phase determination method in the phase determination unit 12i. In FIG. 15, the phase determination unit 12i determines whether the roll angular velocity signal output from the first angular velocity meter 15rg and the yaw angular velocity signal output from the second angular velocity meter 15yg are roughly in phase or in opposite phase. On the other hand, in FIG. 16, the phase determination unit 12i determines whether the gravitational acceleration component exerted on the second accelerometer 16xa and output from the gravitational acceleration fluctuation calculation unit 12a and the X acceleration signal output from the second accelerometer 16xa are roughly in phase or in opposite phase. The effective value correction unit 12j changes the method of finding the effective value C according to the determination result, and the reason will be described with reference to FIGS. 17A to 17D.

First, a situation in which the fluctuation of the gravitational acceleration component is added to an X acceleration signal 1901 output from the second accelerometer 16xa when the X shake is given and the gravitational acceleration component (the state without the roll shake) does not fluctuate is considered. In this situation, there are two directions in which the fluctuation of the gravitational acceleration component is added to the X shake acceleration. One is a waveform 1902 when the fluctuation of the gravitational acceleration component is added to the X shake acceleration, and the other is a waveform 1903 when the fluctuation of the gravitational acceleration component is subtracted from the X shake acceleration.

Comparing a waveform 1904 of the gravitational acceleration component output from the gravitational acceleration fluctuation calculation unit 12a with the above-mentioned waveforms 1902 and 1903, the waveform 1902 when the fluctuation of the gravitational acceleration component is added to the X shake acceleration and the waveform 1904 are in phase, and the waveform 1903 when the fluctuation of the gravitational acceleration component is subtracted from the X shake acceleration and the waveform 1904 are in opposite phase. Therefore, the effective value correction unit 12j sets the absolute value of the difference between the effective value A and the effective value B as the effective value C when in phase, and sets the absolute value of the sum of the effective value A and the effective value B as the effective value C when in opposite phase.

Figure 18:
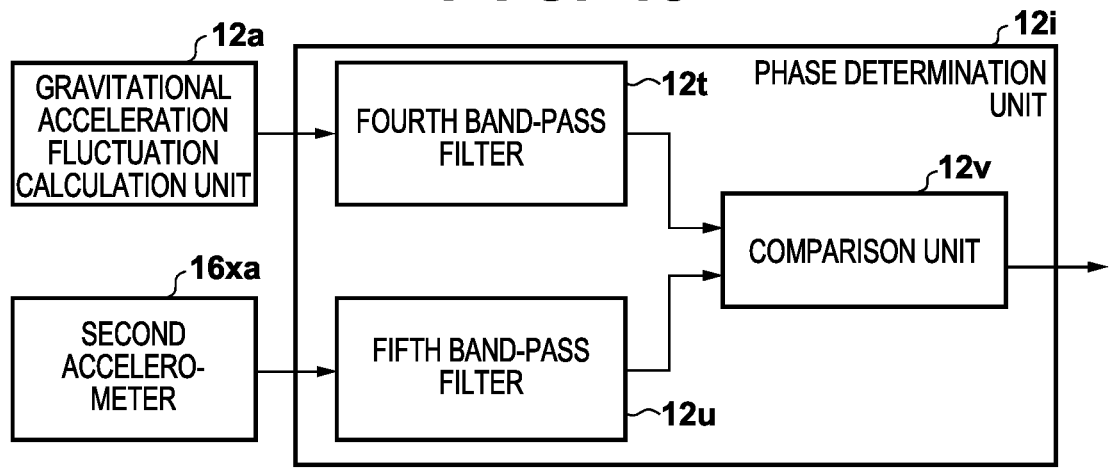
FIG. 18 is a block diagram showing a functional configuration of a phase determination unit according to the fifth embodiment.

FIG. 18 is a block diagram showing a functional configuration of the phase determination unit 12i according to the fifth embodiment. From the gravitational acceleration component from the gravitational acceleration fluctuation calculation unit 12a and the X acceleration signal from the second accelerometer 16xa, signals of a specific frequency (for example, 2 Hz) are extracted by fourth and fifth band-pass filters 12t and 12u, respectively, and the phases of the extracted signals are compared by a comparison unit 12v. The phase comparison can be performed by comparing the sine wave integral and the cosine wave integral in the known discrete Fourier transform. Then, the comparison result is output to the effective value correction unit 12j.

Sixth Embodiment

Next, a sixth embodiment of the present invention will be described.

Figure 19:
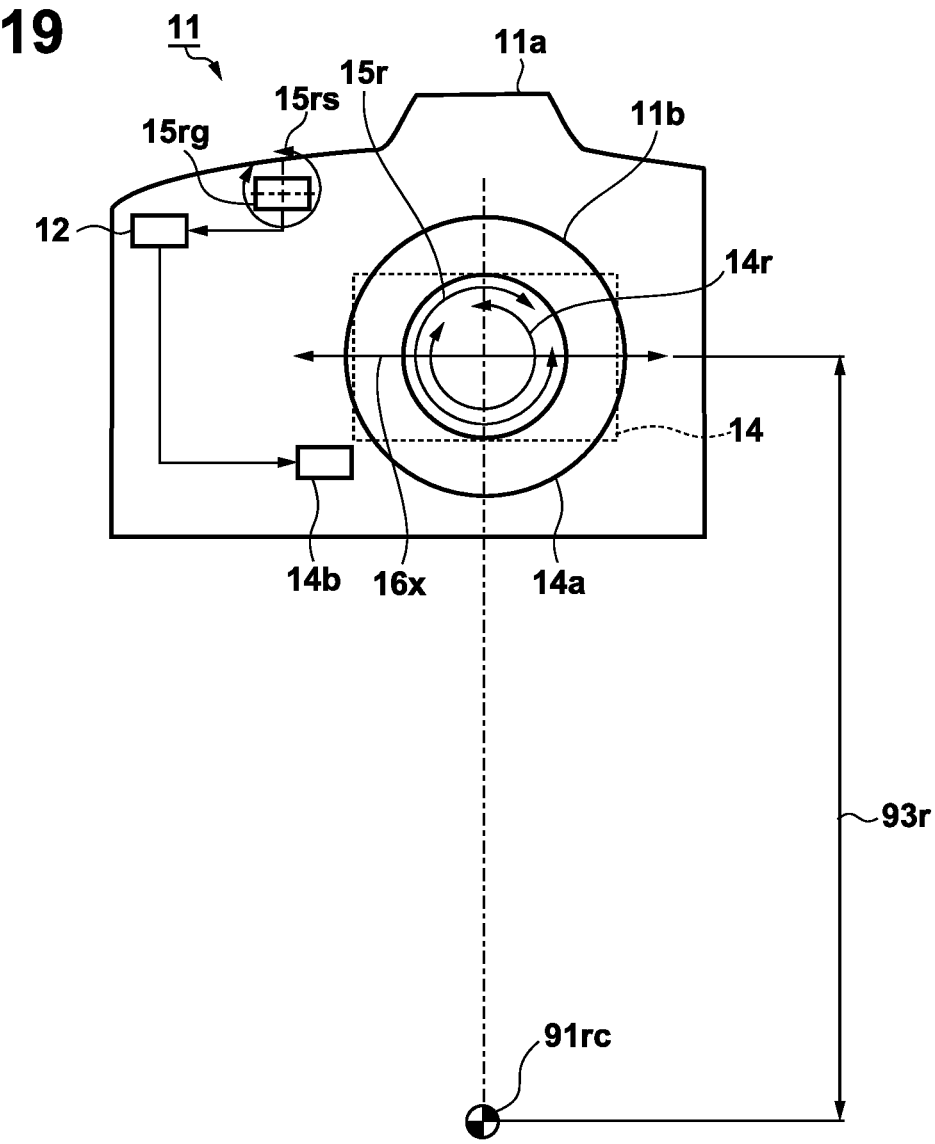
FIG. 19 is a front view of the camera according to a sixth embodiment.

FIG. 19 is a front view of the camera 11 in the sixth embodiment, and since it has the same configuration as that of FIG. 3, the same reference numerals are assigned and the description thereof is omitted. However, since the method of X shake compensation is different from that of the first embodiment, the method of correcting the gravitational acceleration component described later is different from that of the first embodiment. Therefore, FIG. 19 shows an axis of rotation 91rc, a radius of gyration 93r, and the like necessary for explaining the method for correcting the gravitational acceleration component in the sixth embodiment. Since the side view and the top view of the camera 11 in the sixth embodiment are the same as those shown in FIGS. 8 and 9, respectively, the description thereof will be omitted.

Figure 20:
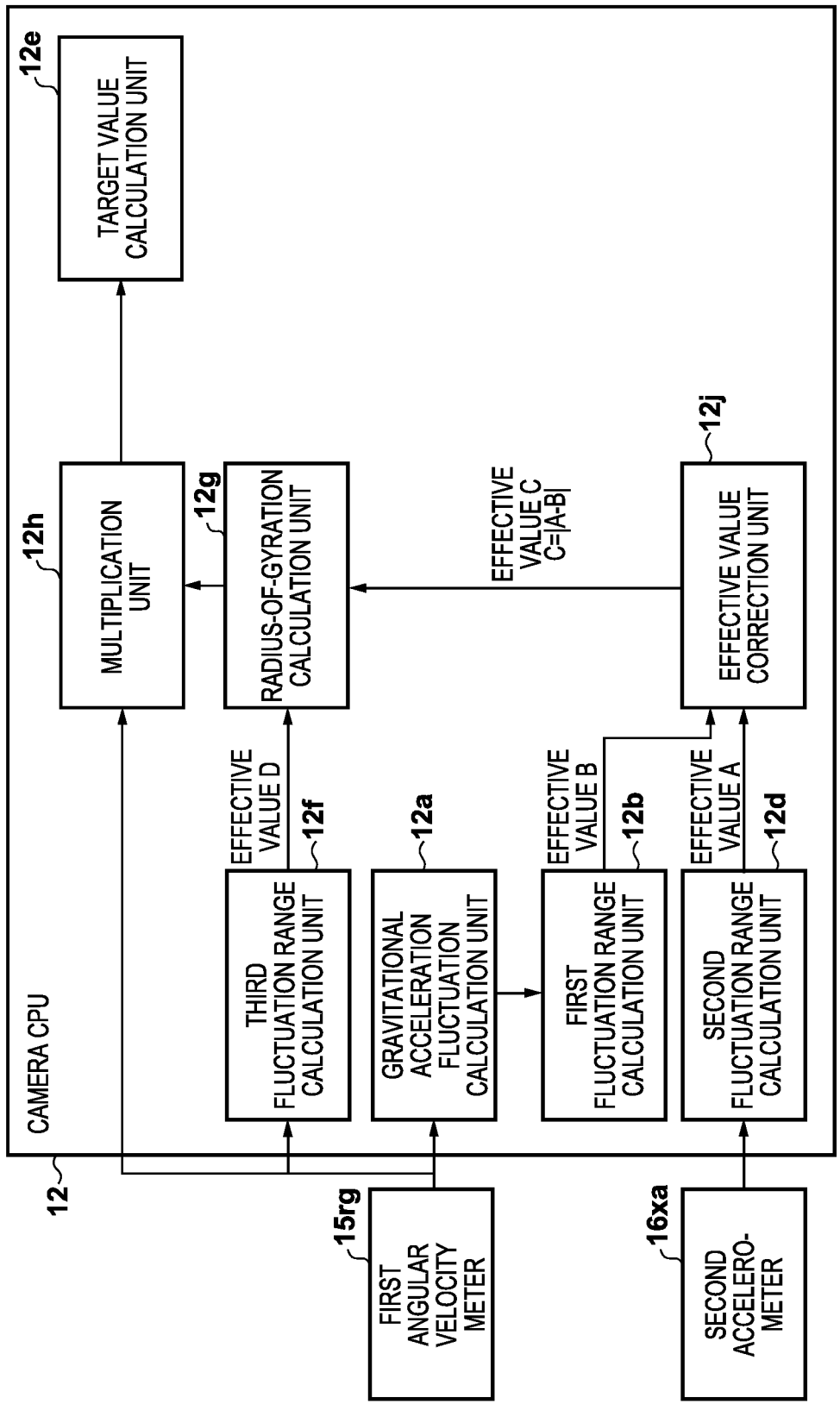
FIG. 20 is a block diagram showing a functional configuration for calculating an X shake reduction target value by reducing a gravitational acceleration component superimposed on an X acceleration signal according to the sixth embodiment.

FIG. 20 is a block diagram showing a functional configuration for calculating the X shake reduction target value by removing a gravitational acceleration component superimposed on an X acceleration signal output from the second accelerometer 16xa in the sixth embodiment, and the function is realized by the camera CPU 12 executing a program. The differences between the block diagrams shown up to FIG. 16 and the block diagram shown in FIG. 20 are as follows.

One is that the radius-of-gyration calculation unit 12g calculates the radius of gyration 93r shown in FIG. 19 from the ratio of the effective value D of the roll angular velocity signal output from the first angular velocity meter 15rg and the effective value C obtained by the effective value correction unit 12j. The multiplication unit 12h obtains the product of the radius of gyration calculated by the radius-of-gyration calculation unit 12g and the roll angular velocity signal output from the first angular velocity meter 15rg, thereby converting the roll angular velocity signal to the X shake velocity in the direction of the arrow 16x in FIG. 1, and inputting it to the target value calculation unit 12e.

The occurrence of the X shake may be caused by the yaw shake as described in the second to fifth embodiments, or may be caused by the roll shake as in the sixth embodiment. Therefore, the image deterioration due to the X shake can be alleviated by the method described corresponding one of the second to sixth embodiments, or the image deterioration can be alleviated after adding both types of the X shake.

Figure 21:
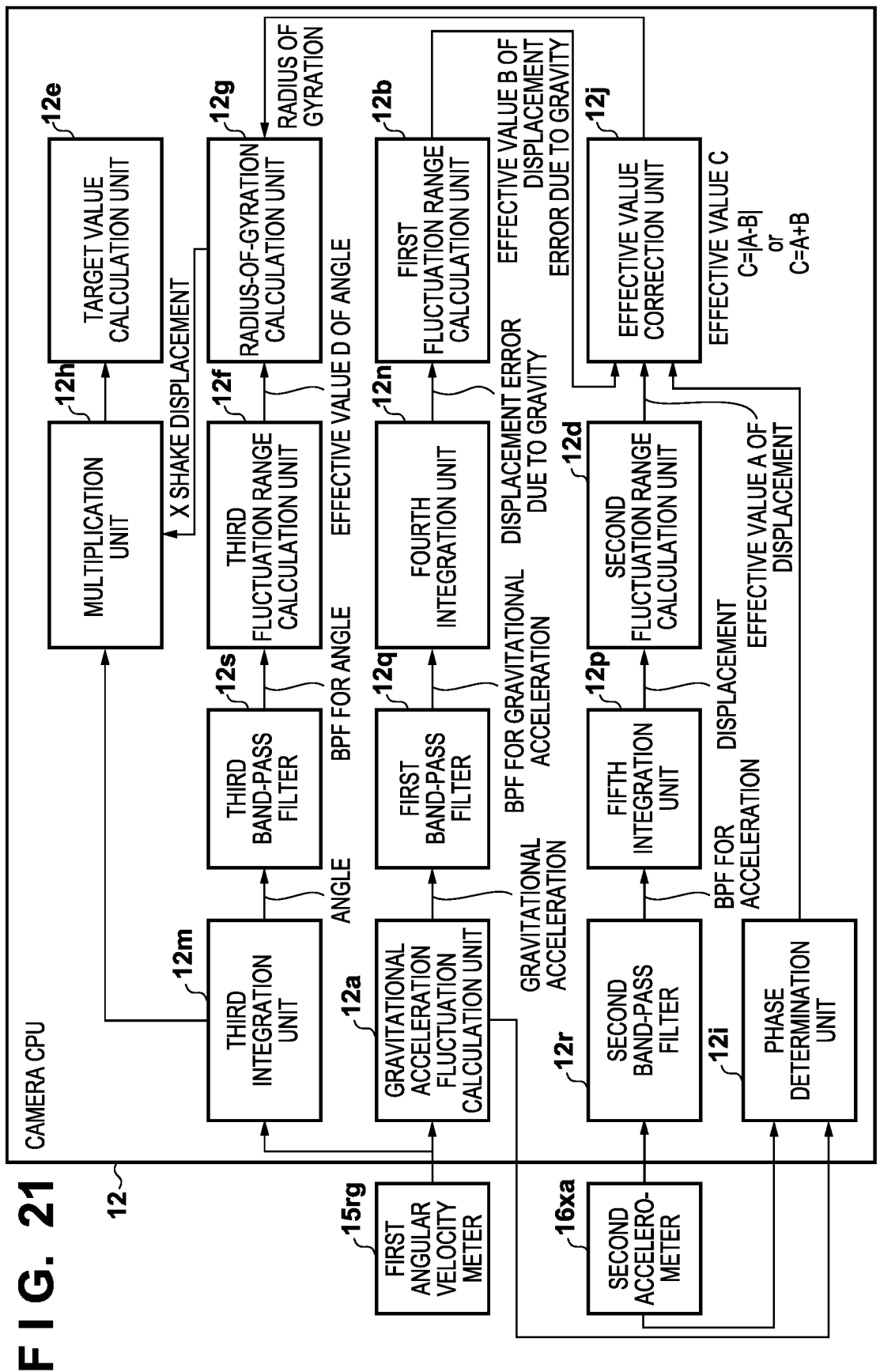
FIG. 21 is a block diagram showing a functional configuration for calculating an X shake reduction target value by reducing a gravitational acceleration component superimposed on an X acceleration signal according to a modification of the sixth embodiment.

The method of obtaining the X shake using roll shake is not limited to the above methods, and can be applied to the functional configurations shown in the block diagrams in FIG. 10 and subsequent figures described so far. For example, the functional configurations shown in FIG. 16 and FIG. 14 may be modified to a functional configuration shown in FIG. 21. In FIG. 21, the X shake is obtained by multiplying the angle obtained by integrating the roll angular velocity signal from the first angular velocity meter 15rg by the radius of gyration, and in calculating an error caused by the gravitational acceleration and in correcting the fluctuation range, the noise is suppressed and the accuracy is improved by performing integration and using a band path filter.

Seventh Embodiment

Next, a seventh embodiment of the present invention will be described. Since the configuration of the camera 11 in the seventh embodiment is the same as that described with reference to FIGS. 1 to 3 or FIGS. 9, 10, and 19, the description thereof is omitted here.

Figure 22:
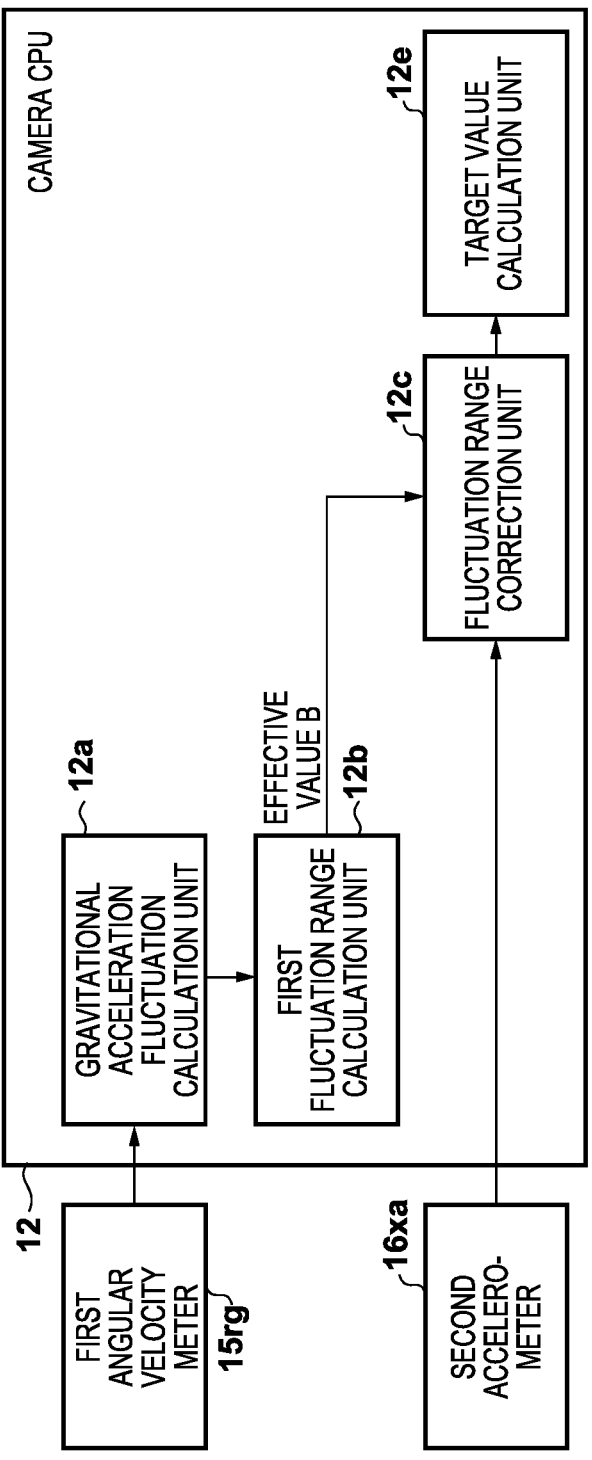
FIG. 22 is a block diagram showing a functional configuration for calculating an X shake reduction target value by reducing a gravitational acceleration component superimposed on an X acceleration signal according to a seventh embodiment.

FIG. 22 is a block diagram showing a functional configuration for calculating an X shake reduction target value by removing the gravitational acceleration component superimposed on an X acceleration signal output from the second accelerometer 16xa in the seventh embodiment, and the function is realized by the camera CPU 12 executing a program.

Unlike the configuration shown in FIG. 5, the configuration shown in FIG. 22 is a simple configuration that does not use the X acceleration signal from the second accelerometer 16xa for correcting the fluctuation range of the gravitational acceleration component. FIG. 22 is the same as FIG. 5 in the point that the gravitational acceleration component is calculated from the roll angular velocity signal output from the first angular velocity meter 15rg, and the fluctuation range of the gravitational acceleration component is used. Then, based on the fluctuation range, the fluctuation range correction unit 12c changes a gain to be applied to the X acceleration signal output from the second accelerometer 16xa. In the seventh embodiment, since it is not necessary to find the effective value A of the X acceleration signal, the influence of the gravitational acceleration component can be reduced at an earlier timing.

Figure 23:
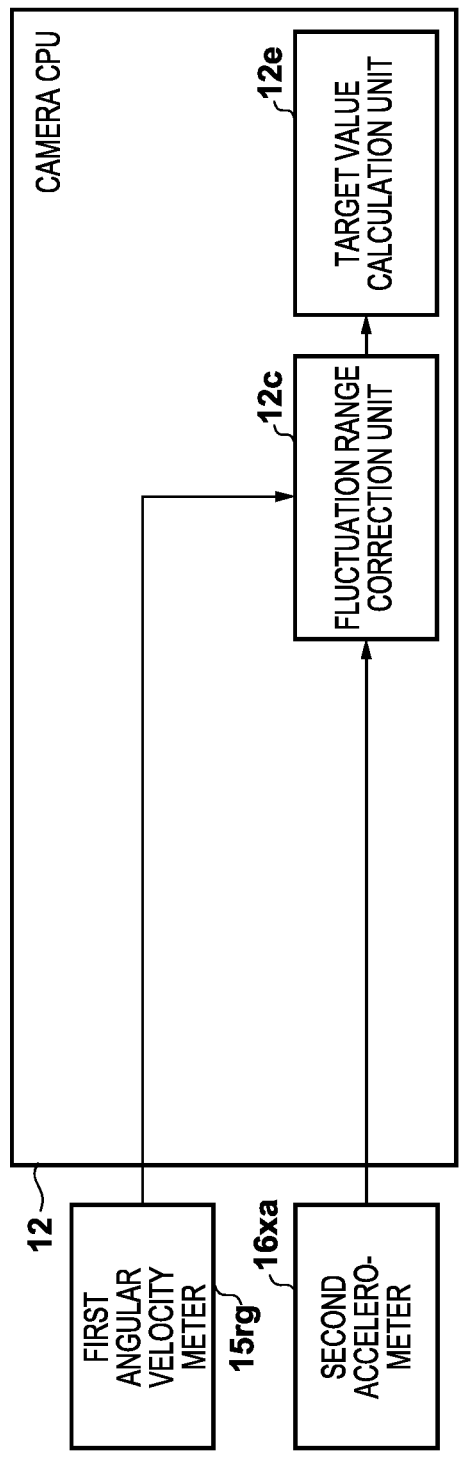
FIG. 23 is a block diagram showing a functional configuration for calculating an X shake reduction target value by reducing a gravitational acceleration component superimposed on an X acceleration signal according to a modification of the seventh embodiment.

Also, to realize a simpler configuration, as shown in FIG. 23, the fluctuation range correction unit 12c may adjust a gain to be applied to the X acceleration signal from the second accelerometer 16xa according to the magnitude of the roll angular velocity signal from the first angular velocity meter 15rg.

Figure 24:
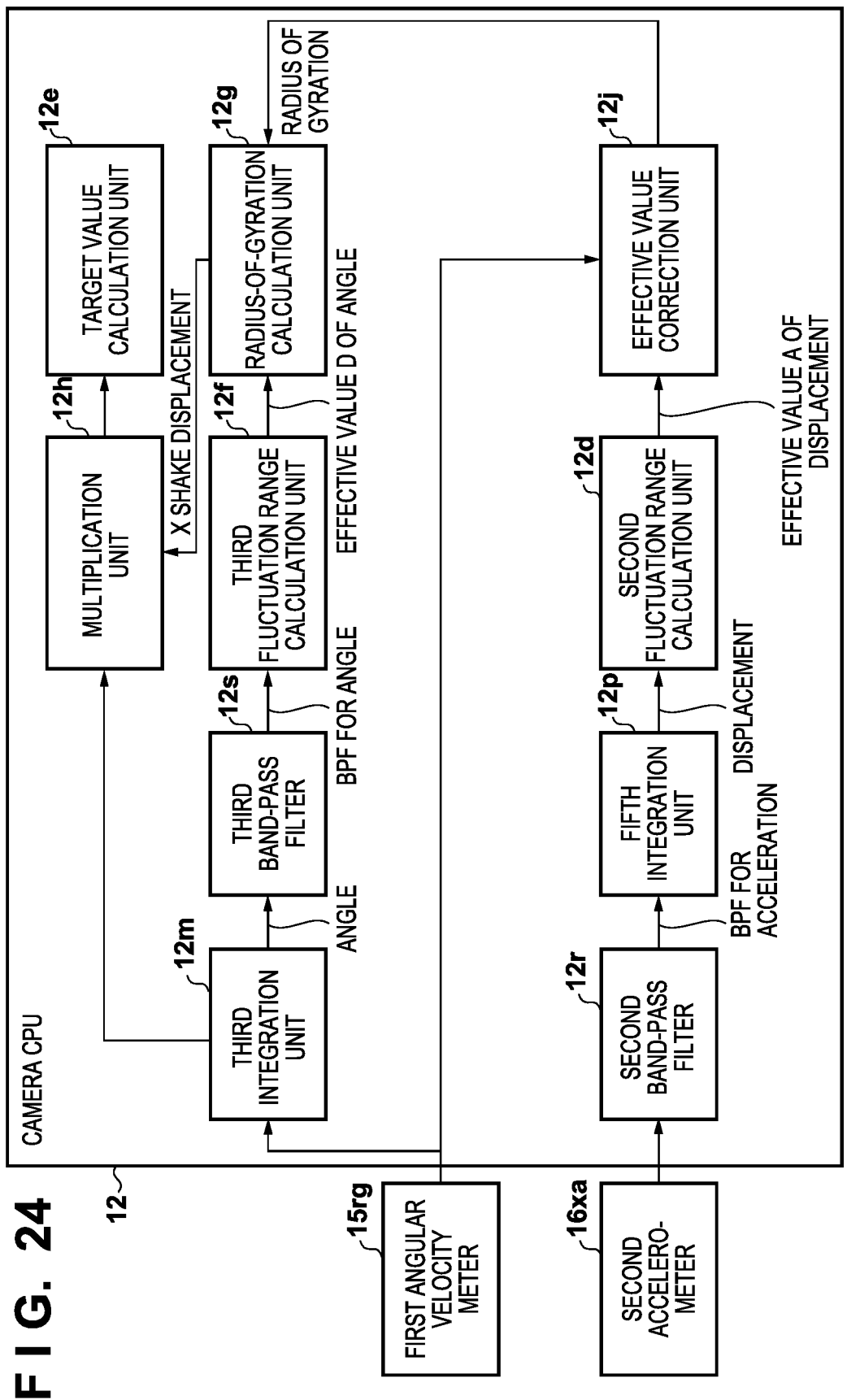
FIG. 24 is a block diagram showing a functional configuration for calculating an X shake reduction target value by reducing a gravitational acceleration component superimposed on an X acceleration signal according to another modification of the seventh embodiment.

Further, the seventh embodiment may be applied to the method of obtaining the radius of gyration as described in the second to sixth embodiments. For example, as shown in FIG. 24, when a roll angular velocity signal output from the first angular velocity meter 15rg becomes large, the fluctuation range correction unit 12c reduces the effective value A output from the second fluctuation range calculation unit 12d. Then, the radius-of-gyration calculation unit 12g obtains the radius of gyration of 93r based on the effective value D of the roll shake angle obtained from the third fluctuation range calculation unit 12f and the reduced effective value A.

Figure 25:
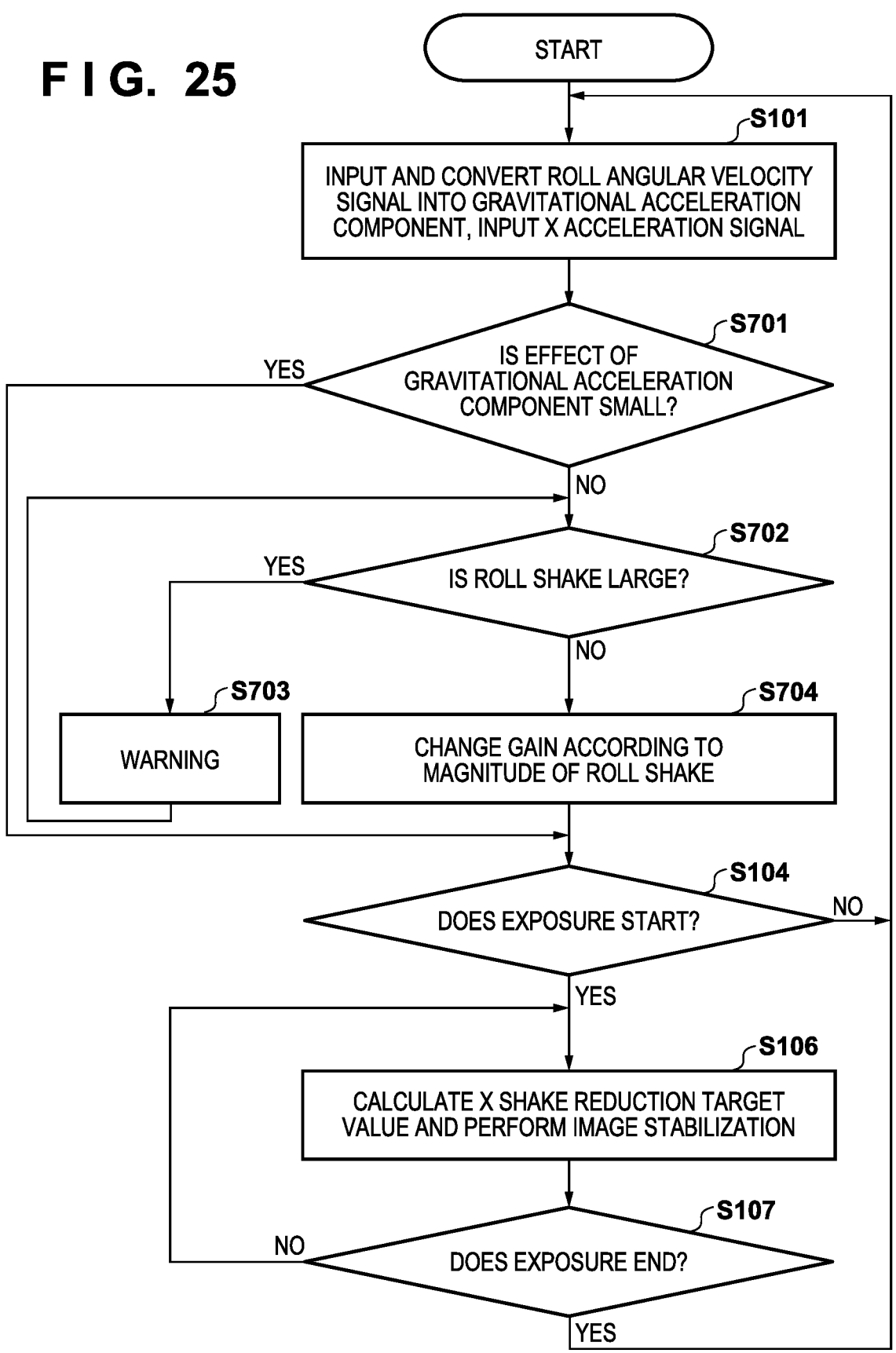
FIG. 25 is a flowchart showing a method of reducing X shake according to the seventh embodiment.

FIG. 25 is a flowchart showing a method of reducing X shake according to the seventh embodiment, and the processing starts when the power of the camera 11 is turned on. The same step numbers are assigned to the same processes as in the flowchart of FIG. 7.

In step S101, the gravitational acceleration component exerted on the second accelerometer 16xa is found by the gravitational acceleration fluctuation calculation unit 12a from the roll angular velocity signal output from the first angular velocity meter 15rg, and is output to the first fluctuation range calculation unit 12b. At the same time, the X acceleration signal output from the second accelerometer 16xa is input to the second fluctuation range calculation unit 12d.

Next, in step S701, it is determined whether or not gravitational acceleration is exerted on the second accelerometer 16xa. Here, as described with reference to FIGS. 4A and 4B, when the posture of the camera is such that the detection direction of the second accelerometer 16xa and the direction of gravity are the same (for example, when the camera 11 is held vertically), since the fluctuation of the gravitational acceleration component due to the roll shake is small, the above-mentioned gain adjustment is not performed. On the other hand, when the posture of the camera is such that the detection direction of the second accelerometer 16xa is different from the direction of gravity (for example, when the camera 11 is held sideways), since the fluctuation of the gravitational acceleration component due to the roll shake becomes large, gain adjustment is performed. Therefore, if it is determined in step S701 that the fluctuation of the gravitational acceleration component exerted on the second accelerometer 16xa due to the roll shake is small, the process proceeds to S104, and steps S702 to S704 described later are skipped. On the other hand, if the fluctuation of the gravitational acceleration component exerted on the second accelerometer 16xa is large, the process proceeds to step S702.

In addition to holding the camera 11 vertically, in a case of shooting the sky with the camera 11 facing up or shooting the ground with the camera facing down, the gravitational acceleration component does not fluctuate much due to the roll shake, so the process proceeds to step S104.

In step S702, the magnitude of the roll angular velocity signal output from the first angular velocity meter 15rg is detected, and if the roll shake is large, the process proceeds to step S703 to warn the photographer and returns to step S702. That is, the flow is prevented from proceeding to the exposure operation.

On the other hand, if the roll shake is within an allowable range, the process proceeds to step S704, and a gain to be applied to the X acceleration signal is changed according to the magnitude of the slope obtained by integrating the roll angular velocity signal output from the first angular velocity meter 15rg. For example, if the tilt of the camera 11 due to roll shake exceeds 0.3 degrees, the gain is quartered, and if it exceeds 0.6 degrees, the gain is halved.

In step S104, the process returns to step S101 until the exposure operation is instructed by the photographer, and when the exposure starts in step S104, the process proceeds to step S106.

In step S106, the target value calculation unit 12e calculates the X shake reduction target value based on the corrected X acceleration signal output from the fluctuation range correction unit 12c. Then, the X shake reduction target value is output to the actuator 13b or 14b, and the lens 13c is actuated in the direction of the arrow 13x or the image sensor 14 is actuated in the direction of the arrow 14x to reduce the deviation of the image plane due to the X shake.

In step S107, the process returns to step S106 to continue the X shake reduction until the exposure is completed, and returns to step S101 when the exposure is completed.

It should be noted that, in the first embodiment, the image sensor 14 is actuated to perform image stabilization, and in the second and subsequent embodiments, the lens 13c is actuated to perform image stabilization. However, the present invention is not limited to any of them, and both of the image sensor 14 and the lens 13c may be coordinately controlled to perform image stabilization. For example, pitch shake and yaw shake may be reduced by using the lens 13c, and X shake, Y shake and roll shake may be reduced by using the image sensor.

Further, in the above-described embodiments, the case where the camera is held in a normal position (a position where the vertical direction of the drawing in FIG. 3 coincides with the gravitational direction) have been described. However, the direction of rotational blur that causes gravitational acceleration with respect to the detection direction of the accelerometer differs depending on the posture of the camera (direction with respect to the direction of gravity). For example, when the lens is directed downward or upward and held so that the optical axis coincides with the direction of gravity, the gravitational acceleration is superimposed on the X acceleration signal due to the yaw shake about the Y axis. Therefore, instead of the detection result of roll shake in the above-described embodiment, the detection result of yaw shake may be used.

Specifically, in the cases of the first to seventh embodiments, the angular velocity signal input to the gravitational acceleration fluctuation calculation unit 12a may be replaced with the yaw angular velocity signal from the second angular velocity meter 15yg, and fluctuation of the gravitational acceleration may be calculated based on the yaw angular velocity signal. If only the angular velocity signal input to the gravitational acceleration fluctuation calculation unit 12a is replaced from the roll angular velocity signal to the yaw angular velocity signal, in the second to fifth embodiments, both the effective value B and the effective value D are based on the signals from the second angular velocity meter 15yg, however, there is no problem. Also, by replacing the first angular velocity meter 15rg with the second angular velocity meter 15yg and replacing the second angular velocity meter 15yg with the first angular velocity meter 15rg, the amount of X shake caused by the roll shake may be obtained as in the sixth embodiment. Further, the amount of X shake caused by roll shake and the amount of X shake caused by yaw shake may be added.

It is more preferable that the angular velocity signal input to the gravitational acceleration fluctuation calculation unit 12a can be selected based on the relationship between the direction of gravity, the Y-axis and the Z-axis. If the direction of gravity and the Y-axis match, the roll angular velocity signal is input to the gravitational acceleration fluctuation calculation unit 12a, and the gravitational acceleration component exerted on the second accelerometer 16xa is calculated based on the roll angular velocity signal. On the other hand, if the direction of gravity and the Z-axis match, the yaw angular velocity signal is input to the gravitational acceleration fluctuation calculation unit 12a, and the gravitational acceleration component exerted on the second accelerometer 16xa is calculated based on the yaw angular velocity signal. When the direction of gravity intersects with the Y-axis direction and the Z-axis direction, it is preferable to calculate the gravitational acceleration component using the angular velocity signal of the rotational motion centered on either of the Y-axis and Z-axis that forms an angle, closer to 90 degrees, with the direction of gravity. For example, when the image capturing apparatus is held in a posture tilted by 10 degrees from the normal position, the gravitational acceleration component exerted on the second accelerometer 16xa is calculated based on the roll angular velocity signal. In addition, although the amount of calculation somewhat increases, when the direction of gravity, the Y-axis direction, and the Z-axis direction intersect with each other, both the gravitational acceleration component caused by the roll shake and the gravitational acceleration component caused by the yaw shake are calculated and added to obtain the gravitational acceleration component.

Further, in the above-described embodiments, the image stabilization control in the image capturing apparatus has been described, but the device to which the present invention can be applied is not limited to the image capturing apparatus, and can be applied to various types of devices.

The present invention may be applied to a system composed of a plurality of devices or an apparatus composed of one device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-121939, filed Jul. 26, 2021 which is hereby incorporated by reference herein in its entirety.

What is claimed is:

1. An image stabilization control apparatus comprising one or more processors and/or circuitry which functions as:
   a first receiving unit that receives a translational shake signal that indicates a translational shake in a first direction;
   a second receiving unit that receives a first rotational shake signal that indicates a rotational shake about a first axis that intersects with the direction of gravity and the first direction;
   a first calculation unit that finds a first fluctuation range of a gravitational component in the first direction based on the first rotational shake signal;
   a second calculation unit that finds an amount of shake in the first direction based on the translational shake signal and the first fluctuation range;
   a third calculation unit that finds a target value for reducing a shake in the first direction based on the amount of shake found by the second calculation unit;
   a fourth calculation unit that finds a second fluctuation range of the translational shake signal; and
   a fifth calculation unit that finds a fluctuation range of the first rotational shake signal as a third fluctuation range, wherein the second calculation unit finds a radius of gyration of a rotational shake converted from the translational shake based on the third fluctuation range and an absolute value of a difference between the first fluctuation range and the second fluctuation range, and finds the amount of shake in the first direction by multiplying the first rotational signal by the radius of gyration.

2. The image stabilization control apparatus according to claim 1, wherein the translational shake signal is a signal that indicates acceleration of the translational shake, and the first rotational shake signal is a signal that indicates angular velocity of the rotational shake.

3. The image stabilization control apparatus according to claim 1, wherein the second fluctuation range is one of a fluctuation range of acceleration, a fluctuation range of velocity and a fluctuation range of displacement.

4. The image stabilization control apparatus according to claim 1, wherein each of the first receiving unit and the second receiving unit includes a band-pass filter that extracts a signal of a predetermined frequency, and the first receiving unit outputs the translation shake signal of the frequency extracted by the band-pass filter and the second receiving unit outputs the first rotational shake signal of the frequency extracted by the band-pass filter.

5. The image stabilization control apparatus according to claim 1, wherein the second receiving unit is capable of receiving signals that indicate rotational shakes about a plurality of axes that intersect with the direction of gravity and the first direction, and the first calculation unit selects a signal to be used as the first rotational signal out of the signals that indicate the rotational shakes about the plurality of axes.

6. An image stabilization control method comprising:
receiving a translational shake signal that indicates a translational shake in a first direction;
receiving a rotational shake signal that indicates a rotational shake about an axis that intersects with the direction of gravity and the first direction;
finding a fluctuation range of a gravitational component in the first direction based on the rotational shake signal;
finding an amount of shake in the first direction based on the translational shake signal and the fluctuation range;
finding a target value for reducing a shake in the first direction based on the amount of shake in the first direction;
finding a second fluctuation range of the translational shake signal; and
finding a fluctuation range of the first rotational shake signal as a third fluctuation range,
wherein a radius of gyration of a rotational shake converted from the translational shake is found based on the third fluctuation range and an absolute value of a difference between the first fluctuation range and the second fluctuation range, and the amount of shake in the first direction is found by multiplying the first rotational signal by the radius of gyration.

* * * * *